(12) United States Patent
Tamura et al.

(10) Patent No.: US 10,420,026 B2
(45) Date of Patent: Sep. 17, 2019

(54) WIRELESS BASE STATION, MOBILE STATION, WIRELESS COMMUNICATION SYSTEM, CONTROL METHOD FOR WIRELESS BASE STATION, AND RECORDING MEDIUM

(71) Applicant: NEC Corporation, Minato-ku, Tokyo (JP)

(72) Inventors: Tomu Tamura, Tokyo (JP); Yoshio Ueda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 89 days.

(21) Appl. No.: 15/509,576

(22) PCT Filed: Sep. 3, 2015

(86) PCT No.: PCT/JP2015/075026
§ 371 (c)(1),
(2) Date: Mar. 8, 2017

(87) PCT Pub. No.: WO2016/052066
PCT Pub. Date: Apr. 7, 2016

(65) Prior Publication Data
US 2017/0289906 A1    Oct. 5, 2017

(30) Foreign Application Priority Data

Sep. 30, 2014  (JP) ................................ 2014-199733

(51) Int. Cl.
*H04W 52/02*  (2009.01)
*H04W 36/22*  (2009.01)
(Continued)

(52) U.S. Cl.
CPC ....... *H04W 52/0212* (2013.01); *H04W 36/22* (2013.01); *H04W 48/06* (2013.01);
(Continued)

(58) Field of Classification Search
None
See application file for complete search history.

(56) References Cited

U.S. PATENT DOCUMENTS 6,845,238 B1 *  1/2005  Muller ................. H04W 36/18
                                                         370/331
8,700,059 B1    4/2014  Vivanco et al.
(Continued)

FOREIGN PATENT DOCUMENTS

CN    102014422 A    4/2011
CN    102227930 A    10/2011
(Continued)

OTHER PUBLICATIONS

3rd Generation Partnership Project;Technical Specification Group Radio Access Network;Study on Wireless Local Area Network (WLAN)—3GPP radio interworking (Release 12), 3GPP TR 37.834 V12.0.0 (Dec. 2013).
(Continued)

*Primary Examiner* — Steve R Young

(57) ABSTRACT

A wireless base station includes: a communication unit 101 configured to communicate with a mobile station which measures radio quality of a signal transmitted in each of a plurality of cells; an acquisition unit 102 configured to acquire load information related to a load of a network including a wireless base station forming the cell; and a control unit 103. The control unit 103 receives information indicating a measurement result of the radio quality of the signal transmitted in each of the plurality of cells and a state of a battery of the mobile station, from the mobile station via the communication unit, determines a signal, radio quality of which is to be measured by the mobile station, based on the measurement results of the radio qualities and the state of the battery of the mobile station, indicated in the information received, and the load information acquired by the acquisi-
(Continued)

tion unit, and notifies the signal determined to be measured to the mobile station via the communication unit.

3 Claims, 16 Drawing Sheets

(51) Int. Cl.
*H04W 72/08* (2009.01)
*H04W 48/06* (2009.01)
*H04W 48/08* (2009.01)
*H04W 88/02* (2009.01)
*H04W 88/08* (2009.01)

(52) U.S. Cl.
CPC .......... *H04W 48/08* (2013.01); *H04W 52/02* (2013.01); *H04W 52/0277* (2013.01); *H04W 72/085* (2013.01); *H04W 88/02* (2013.01); *H04W 88/08* (2013.01); *Y02D 70/00* (2018.01); *Y02D 70/124* (2018.01); *Y02D 70/1262* (2018.01); *Y02D 70/1264* (2018.01); *Y02D 70/142* (2018.01); *Y02D 70/23* (2018.01)

(56) References Cited

U.S. PATENT DOCUMENTS

| | | |
|---|---|---|
| 2004/0219918 A1 | 11/2004 | Kakishima et al. |
| 2011/0201367 A1 | 8/2011 | Aminaka et al. |
| 2012/0077445 A1 | 3/2012 | Konno et al. |
| 2012/0214529 A1* | 8/2012 | Ohta ................... H04W 52/343 455/509 |
| 2013/0016639 A1* | 1/2013 | Xu ........................... H04L 5/001 370/311 |
| 2014/0126403 A1* | 5/2014 | Siomina ................ H04W 24/10 370/252 |
| 2014/0140293 A1* | 5/2014 | Sharma .................. H04L 5/001 370/329 |
| 2015/0029917 A1* | 1/2015 | Kim .................. H04W 52/0209 370/311 |
| 2015/0350990 A1* | 12/2015 | Fujishiro ............... H04W 48/18 370/331 |
| 2017/0006620 A1* | 1/2017 | Reis ........................ H04L 43/16 |
| 2017/0238320 A1* | 8/2017 | Fukuta .................. H04W 16/14 370/329 |

FOREIGN PATENT DOCUMENTS

| | | |
|---|---|---|
| CN | 102450072 A | 5/2012 |
| JP | 2004-260444 A | 9/2004 |
| JP | 2014-116983 A | 6/2014 |
| JP | 2014-522598 A | 9/2014 |
| WO | 2007/080627 A1 | 7/2007 |
| WO | 2010/140347 A1 | 12/2010 |
| WO | 2014/112563 A1 | 7/2014 |
| WO | 2014/112599 A1 | 7/2014 |

OTHER PUBLICATIONS

3rd Generation Partnership Project;Technical Specification Group Radio Access Network;Evolved Universal Terrestrial Radio Access (E-UTRA) and Evolved Universal Terrestrial Radio Access Network (E-UTRAN);Overall description; Stage 2 (Release 12), 3GPP TS 36.300 V12.1.0 (Mar. 2014).
3rd Generation Partnership Project;Technical Specification Group Radio Access Network;Study on Small Cell enhancements for E-UTRA and E-UTRAN; Higher layer aspects (Release 12), 3GPP TR 36.842 V12.0.0 (Dec. 2013).
International Search Report for PCT Application No. PCT/JP2015/075026, dated Nov. 17, 2015.
English translation of Written opinion for PCT Application No. PCT/JP2015/075026.
Extended European Search Report for EP Application No. EP15847572.3 dated Apr. 16, 2018.
Japanese Office Action for JP Application No. 2016-551671 dated Dec. 25, 2018 with English Translation.
Ohinese Office Action for CN Application No. 201580053255.7 dated Jun. 26, 2019 with English Translation.

* cited by examiner

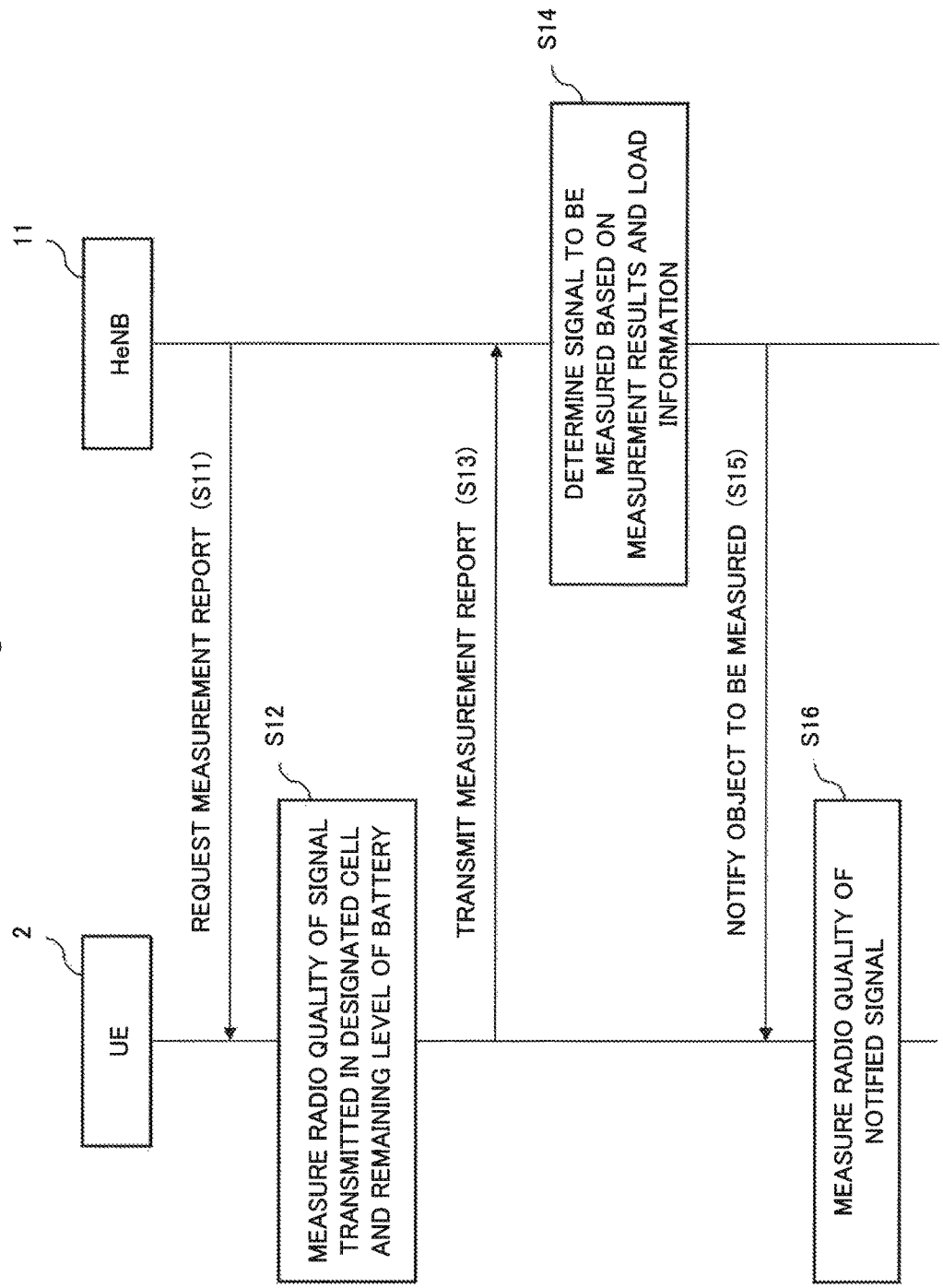

Fig. 6

MeasResults Information element

```
-- ASN1START

MeasResults ::=            SEQUENCE {
    measId                     MeasId,
    measResultPCell        SEQUENCE {
        rsrpResult                 RSRP-Range,
        rsrqResult                 RSRQ-Range
    },
    measResultNeighcells       CHOICE {
        measResultListEUTRA        MeasResultListEUTRA,
        measResultListUTRA         MeasResultListUTRA,
        measResultListGERAN        MeasResultListGERAN,
        measResultsCDMA2000        MeasResultsCDMA2000,
        ...
    }                                                        OPTIONAL,
    ....
    batteryLevel               INTEGER (0 .. 100)            OPTIONAL,
    ....
    [[ measResultForECID-r9    MeasResultForECID-r9          OPTIONAL
    ]],
    [[ locationInfo-r10        LocationInfo-r10              OPTIONAL,
        measResultServFreqList-r10  MeasResultServFreqList-r10  OPTIONAL,
    ]]
}
(OMITTED)
-- ASN1STOP
```

Fig. 8

| OBJECT TO BE MEASURED | RADIO QUALITY (EXAMPLE: RSRQ) *BEFORE CHANGE OF OBJECT TO BE MEASURED | RADIO QUALITY (EXAMPLE: RSRQ) *AFTER CHANGE OF OBJECT TO BE MEASURED |
|---|---|---|
| E-UTRAN CELL 11a (FREQUENCY X) | −1dB | — |
| GSM CELL 24a | −2dB | −2dB |
| UTRAN CELL 20a | −3dB | — |
| E-UTRAN CELL 13a (FREQUENCY Y) | −4dB | — |
| WLAN CELL 27a | −5dB | −5dB |
| E-UTRAN CELL 14a (FREQUENCY Z) | −6dB | — |

Fig. 18

| Information Element/ Group name | Need | Multi | Type end reference | Semantics description |
|---|---|---|---|---|
| CHOICE Measurement | MP | | | One spare value is needed. |
| >Inter-frequency measured results list | | | Intra-frequency measured results list 10.3.7.35 | |
| >Inter-frequency measured results list | | | Inter-frequency measured results list 10.3.7.15 | |
| >Inter-RAT measured results list | | | Inter-RAT measured results list 10.3.7.26 | |
| >Traffic volume measured results list | | | Traffic volume measured results list 10.3.7.67 | |
| >Quality measured results list | | | Quality measured results list 10.3.7.55 | |
| >UE Internal measured results | | | UE internal measured results 10.3.7.76 | |
| >UE positioning measured results | | | UE positioning measured results 10.3.7.99 | |
| batteryLevel | OP | | | | ized

WIRELESS BASE STATION, MOBILE STATION, WIRELESS COMMUNICATION SYSTEM, CONTROL METHOD FOR WIRELESS BASE STATION, AND RECORDING MEDIUM

REFERENCE TO RELATED APPLICATION

This application is a National Stage Entry of PCT/JP2015/075026 filed on Sep. 3, 2015, which claims priority from Japanese Patent Application 2014-199733 filed on Sep. 30, 2014, the contents of all of which are incorporated herein by reference, in their entirety.

TECHNICAL FIELD

The present invention relates to a wireless base station, a mobile station, a wireless communication system, a control method for a wireless base station, and a program.

BACKGROUND ART

In recent years, since the communication areas of a plurality of networks having different communication schemes are overlapped, mobile stations are often connected to any of these networks and provided with communication services. Examples of the above-mentioned communication schemes include a GSM (Global System for Mobile Communication), a UTRAN (Universal Terrestrial Access Network), and an E-UTRAN (Evolved UTRAN).

With the recent increase in traffic, an attempt has been made to reduce the load of a radio access network equipped with macro base stations by locating small mobile phone base stations or wireless LAN (WLAN: Wireless Local Area Network) base stations. Another attempt has been made to reduce the load of a core network by sending the traffic of mobile stations from small wireless base stations or wireless LANs to the external network (Internet) without a core network which is host to a radio access network. A network established by combining networks having different communication schemes, as described above, is called a HetNet (Heterogeneous Network).

Regarding the HetNet, a method for cooperation between a wireless LAN and a mobile phone network is described in NPL 1 (3GPP (3rd Generation Partnership Project) TR 37.834 v12.0.0). In this method, a mobile station measures the radio qualities of signals transmitted from both the wireless LAN and the mobile phone network. The mobile station then determines a network to be connected, on the basis of factors such as the measurement results of the radio qualities in accordance with a policy or a threshold set from the mobile phone network or an instruction from the mobile phone network.

PTL 1 (Japanese Unexamined Patent Application Publication No. 2004-260444) discloses a method for implementing a seamless handover while reducing the processing load in a HetNet. In this method, a mobile station measures the radio quality of a signal from a radio access station in each of a plurality of networks having different communication schemes and determines a radio access station to be connected on the basis of the measurement results. A network controller which is host to a radio access station controls the handover operation of a mobile station on the basis of a radio access station to be connected, a network accommodating the radio access station, and the moving speed of the mobile station.

In the above-mentioned methods described in NPL 1 and PTL 1, the mobile station needs to measure the radio quality of a signal from a network having each communication scheme. Therefore, the number of signals, the radio qualities of which are to be measured by the mobile station, increases, and the power consumption of the mobile station, in turn, increases.

To overcome this issue, PTL 2 (International Publication No. WO 2007/080627) discloses a method for suppressing the increase of the power consumption of a mobile station in a wireless communication system in which the communication areas of a 3rd generation mobile communication system (3G), a 4th generation mobile communication system (4G), and Super 3G (S3G) intermediate between 3G and 4G are overlapped. In this method, the mobile station selects signals, the radio qualities of which are to be measured, from signals of each of 3G, S3G, and 4G in accordance with the remaining level of the battery and determines a connection destination from networks corresponding to the signals, the radio qualities of which have been measured. Selecting signals, the radio qualities of which are to be measured, can suppress the increase of the power consumption of the mobile station compared to the case where the radio qualities of signals of each of 3G, S3G, and 4G are measured.

The problem that the power consumption of the mobile station increases due to an increase in number of objects, the radio qualities of which are to be measured, is not limited to a HetNet. This problem may also arise in CA (Carrier Aggregation) defined in NPL 2 (3GPP TS 36.300 v12.1.0).

CA is a technique for transmitting and receiving data using a maximum of five component carriers (to be referred to as CCs hereinafter) having a maximum of 20 MHz. In CA, the mobile station needs to measure the radio qualities of signals having a plurality of frequency bands to use CCs having different frequencies in combination, thus the power consumption of the mobile station increases.

The above-mentioned problem sometimes arise even in DC (Dual Connectivity) defined by NPL 3 (3GPP TR 36.842 v12.0.0).

In DC, a Master eNB (evolved NodeB) (to be referred to as an MeNB hereinafter) and a Secondary eNB (to be referred to as an SeNB hereinafter) are defined. The mobile station exchanges control data with the far MeNB and exchanges user data with the near SeNB. In DC, the mobile station needs to measure the radio qualities of signals transmitted in cells respectively formed by the MeNB and the SeNB, thus the power consumption of the mobile station increases.

CITATION LIST

Patent Literature

PTL 1: Japanese Unexamined Patent Application Publication No. 2004-260444
PTL 2: International Publication No. WO 2007/080627

Non Patent Literature

NPL 1: 3GPP TR 37.834 v12.0.0
NPL 2: 3GPP TS 36.300 v12.1.0
NPL 3: 3GPP TR 36.842 v12.0.0

SUMMARY OF INVENTION

Technical Problem

According to the above described methods described in PTL 1 and NPL 1, there is a problem that the power consumption of the mobile station increases.

According to the method disclosed in PTL 2, an attempt can be made to suppress the increase of the power consumption of the mobile station. In the method disclosed in PTL 2, however, the mobile station selects signals, the radio qualities of which are to be measured, and determines a connection destination on the basis of the measurement results. Therefore, according to the method disclosed in PTL 2, there is a problem that the object, the radio quality of which is to be measured by the mobile station may not be controlled, in consideration of the network load from the side of the wireless base station.

There is sometimes the case that, for example, the radio quality of a signal from a mobile phone base station in a mobile station is better than that of a signal from a wireless LAN base station, but nonetheless no more data is wanted from the mobile station due to congestion of the mobile phone base station. Even in such a case, in the method disclosed in PTL 2, the mobile station may select a signal from the mobile phone base station as an object to be measured and thus determine the mobile phone base station as a connection destination.

The above-mentioned issue has not been sufficiently examined even in NPLs 2 and 3.

It is an object of the present invention to provide a wireless base station, a mobile station, a wireless communication system, a control method for a wireless base station, and a program which can control an object, the radio quality of which is to be measured by the mobile station, in consideration of the network load to attempt to suppress the increase of the power consumption of the mobile station.

Solution to Problem

In order to achieve the above-described object, a wireless base station according to the present invention includes:

a communication unit which communicates with a mobile station which measures radio quality of a signal transmitted in each of a plurality of cells;

an acquisition unit which acquires load information related to a load of a network including a wireless base station forming the cell; and a control unit which receives information indicating a measurement result of the radio quality of the signal transmitted in each of the plurality of cells and a state of a battery of the mobile station, from the mobile station via the communication unit, determines a signal, radio quality of which is to be measured by the mobile station, on the basis of the measurement results of the radio qualities and the state of the battery of the mobile station, indicated in the received information, and the load information acquired by the acquisition unit, and notifies the signal determined to be measured to the mobile station via the communication unit.

In order to achieve the above-described object, a mobile station according to the present invention includes:

a battery;

a communication unit which communicates with a wireless base station;

a measuring unit which measures radio quality of a signal transmitted in each of a plurality of cells; and a control unit which transmits information indicating a measurement result of the radio quality of the signal transmitted in each of the plurality of cells, obtained by the measuring unit, and a state of the battery of the mobile station, to the wireless base station via the communication unit, and, upon being notified a signal, the radio quality of which is to be measured, from the wireless base station via the communication unit, causes the measuring unit to measure the radio quality of the notified signal.

In order to achieve the above-described object, a wireless communication system according to the present invention includes:

a mobile station; and a wireless base station which communicates with the mobile station, wherein the mobile station measures radio quality of a signal transmitted in each of a plurality of cells and transmits information indicating a measurement result of the radio quality of the signal transmitted in each of the plurality of cells and a state of a battery of the mobile station to the wireless base station, the wireless base station acquires load information related to a load of a network including a wireless base station forming the cell, determines a signal, radio quality of which is to be measured by the mobile station, on the basis of the measurement results of the radio qualities and the state of the battery of the mobile station, transmitted from the mobile station, and the acquired load information, and notifies the signal determined to be measured to the mobile station, and the mobile station measures radio quality of the signal notified from the wireless base station.

In order to achieve the above-described object, a control method for a wireless base station according to the present invention includes:

communicating with a mobile station which measures radio quality of a signal transmitted in each of a plurality of cells;

acquiring load information related to a load of a network including a wireless base station forming the cell; and receiving information indicating a measurement result of the radio quality of the signal transmitted in each of the plurality of cells and a state of a battery of the mobile station, from the mobile station, determining a signal, radio quality of which is to be measured by the mobile station, on the basis of the measurement results of the radio qualities and the state of the battery of the mobile station, indicated in the received information, and the load information acquired by the acquisition unit, and notifying the signal determined to be measured to the mobile station.

In order to achieve the above-described object, a computer-readable recording medium according to the present invention records a program for causing a computer within a wireless base station to perform the processes of:

communicating with a mobile station which measures radio quality of a signal transmitted in each of a plurality of cells;

acquiring load information related to a load of a network including a wireless base station forming the cell; and receiving information indicating a measurement result of the radio quality of the signal transmitted in each of the plurality of cells and a state of a battery of the mobile station, from the mobile station, determining a signal, radio quality of which is to be measured by the mobile station, on the basis of the measurement results of the radio qualities and the state of the battery of the mobile station, indicated in the received information, and the load information acquired by the acquisition unit, and notifying the signal determined to be measured to the mobile station.

Advantageous Effects of Invention

According to the present invention, an object, the radio quality of which is to be measured by a mobile station, can be controlled in consideration of the network load to attempt to suppress the increase of the power consumption of the mobile station.

BRIEF DESCRIPTION OF DRAWINGS

FIG. 5 is a sequence chart illustrating the operations of the HeNB and the UE illustrated in FIG. 1.

FIG. 6 is a view illustrating an exemplary structure of a measurement report.

FIG. 8 is a diagram illustrating signals, the radio qualities of which are to be measured by the UE illustrated in FIG. 1.

FIG. 18 is a view illustrating another exemplary structure of a measurement report.

DESCRIPTION OF EMBODIMENTS

Embodiments of the present invention will be described below with reference to the drawings.

First Exemplary Embodiment

Figure 1:
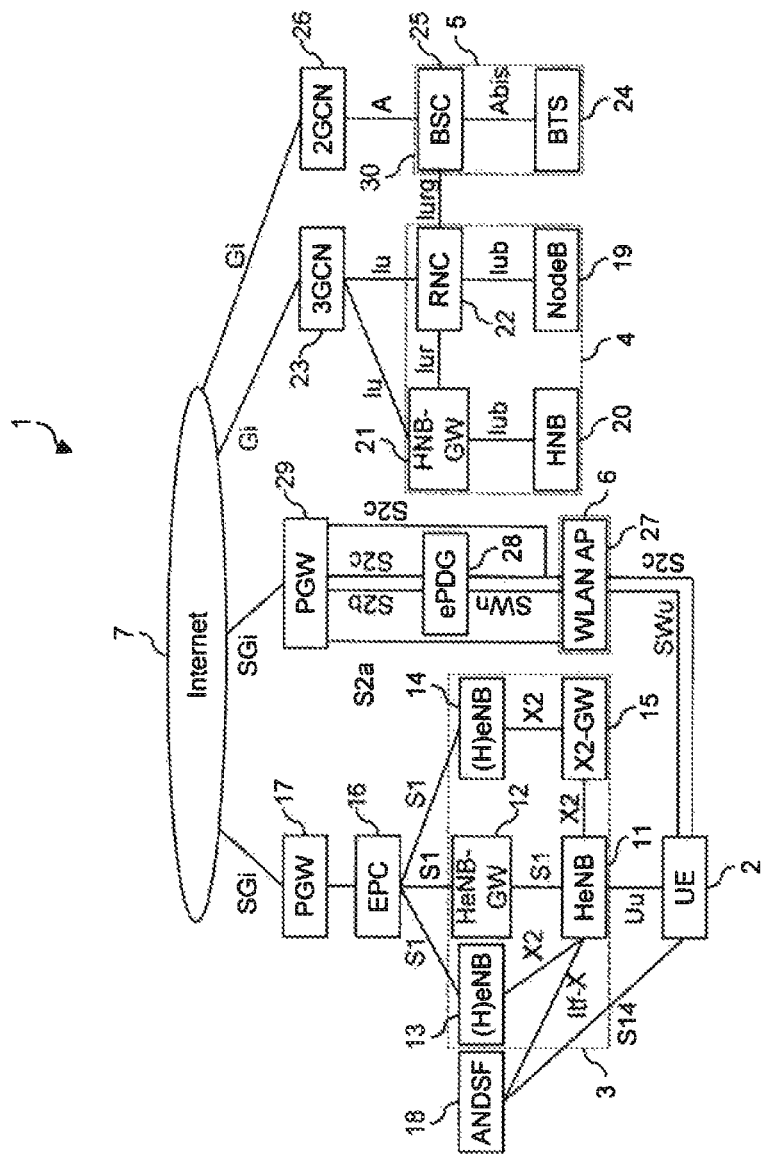
FIG. 1 is a diagram illustrating the configuration of a wireless communication system according to a first exemplary embodiment of the present invention.

FIG. 1 is a diagram illustrating the configuration of a wireless communication system 1 according to a first exemplary embodiment of the present invention.

The wireless communication system 1 illustrated in FIG. 1 includes a UE (User Equipment) 2, an HeNB (Home eNB) 11, an HeNB-GW (Home eNB Gateway) 12, (H)eNBs 13 and 14, an X2-GW 15, an EPC (Evolved Packet Core) 16, a PGW (Packet Data Network Gateway) 17, an ANDSF (Access Network Discovery and Selection Function) 18, a NodeB 19, an HNB (Home NodeB) 20, an HNB-GW (Home NodeB Gateway) 21, an RNC (Radio Network Controller) 22, a 3GCN (3rd Generation Core Network) 23, a BTS (Base Transceiver Station) 24, a BSC (Base Station Controller) 25, a 2GCN (2nd Generation Core Network) 26, a WLAN AP (Wireless Local Area Network Access Point) 27, an ePDG (evolved Packet Data Gateway) 28, and a PGW 29.

The HeNB 11 is a small wireless base station forming a cell as a communication area which allows wireless communication with the UE 2. The HeNB wirelessly communicates with the UE 2 camping on the cell formed by the HeNB, via a Uu interface using the LTE (Long Term Evolution) scheme.

The HeNB-GW 12 is connected to the HeNB 11 via an S1 interface and manages the HeNB 11.

The (H)eNBs 13 and 14 are HeNBs or eNBs (so-called macro base stations) and are wireless base stations forming cells. The (H)eNBs 13 and 14 wirelessly communicate with the UE 2 camping on the cell formed by the (H)eNBs 13 and 14, using the LTE scheme. The (H)eNB 13 is connected to the HeNB 11 via an X2 interface.

The X2-GW 15 is connected to the HeNB 11 and the (H)eNB 14 via X2 interfaces. The X2-GW 15 relays communication between the HeNB 11 and the (H)eNB 14.

The HeNB 11, the HeNB-GW 12, the (H)eNBs 13 and 14, and the X2-GW 15 configure an E-UTRAN 3, that is, an E-UTRAN network.

The EPC 16 is a core network device compatible with the E-UTRAN 3. The EPC 16 is connected to the HeNB-GW 12 and the (H)eNBs 13 and 14 via S1 interfaces. The EPC 16 performs an authentication, movement control, bearer management, billing, QoS (Quality of Service) control and the like.

The PGW 17 is connected to the EPC 16 and connected to the Internet 7 via an SGi interface. The PGW 17 performs data transfer between the E-UTRAN 3 and the Internet 7.

The ANDSF 18 provides data (for example, a policy) for assisting the UE 2 in discovering and connecting to a network in accordance with a policy defined by the operator to the UE 2 via an S14 interface. The above-mentioned data providing is done in response to requests for access network discovery information from the UE 2.

Currently, no interfaces are defined between the ANDSF 18 and other nodes (for example, the HeNB 11, the (H)eNBs 13 and 14, the HNB 20, the RNC 22, and the BSC 25). The following description assumes that interfaces referred to as ltf-X (ltf-X interfaces) are defined between the ANDSF 18 and other nodes.

Referring to FIG. 1, the HeNB-GW 12 is not indispensable. The (H)eNBs 13 and 14 are connected to the EPC 16 without the HeNB-GW 12. Referring again to FIG. 1, the X2-GW 15 is not indispensable either. The HeNB 11 is directly connected to the (H)eNB 13 without the X2-GW 15.

The NodeB 19 is a wireless base station (so-called macro base station) forming a cell. The NodeB 19 wirelessly communicates with the UE 2 camping on the cell formed by the NodeB 19, using the UTRAN scheme.

The HNB 20 is a small wireless base station forming a cell. The HNB 20 wirelessly communicates with the UE 2 camping on the cell formed by the HNB 20, using the UTRAN scheme.

The HNB-GW 21 is connected to the HNB 20 via an Iub interface and manages the HNB 20.

The RNC 22 is connected to the NodeB 19 via an Iub interface and connected to the HNB-GW 21 via an Iur interface. The RNC 22 performs, for example, management and handover control of the NodeB 19 and the HNB 20. The RNC 22 is further connected to the BSC 25 via an Iurg interface.

The NodeB 19, the HNB 20, the HNB-GW 21, and the RNC 22 configure a UTRAN 4, that is, a UTRAN network.

The 3GCN 23 is a core network device compatible with the UTRAN 4. The 3GCN 23 is connected to the HNB-GW 21 and the RNC 22 via Iu interfaces and connected to the Internet 7 via a Gi interface. The 3GCN 23 performs, for example, data transfer between the UTRAN 4 and the Internet 7.

The BTS 24 is a wireless base station forming a cell. The BTS 24 wirelessly communicates with the UE 2 camping on the cell formed by the BTS 24, using the GSM scheme.

The BSC 25 is connected to the BTS 24 via an Abis interface and performs, for example, control of the BTS 24.

The BTS 24 and the BSC 25 configure a GSM 5, that is, a GSM network.

The 2GCN 26 is a core network device compatible with the GSM 5. The 2GCN 26 is connected to the BSC 25 via an A interface and connected to the Internet 7 via a Gi interface. The 2GCN 26 performs, for example, data transfer between the GSM 5 and the Internet 7.

The WLAN AP 27 is a wireless base station (WLAN base station) forming a cell. The WLAN AP 27 wirelessly communicates with the UE 2 camping on the cell formed by the WLAN AP 27, using the WLAN scheme. The WLAN AP 27 configures a WLAN 6, that is, a WLAN network.

The ePDG 28 is a core network device compatible with the WLAN 6. The ePDG 28 relays traffic between the WLAN AP 27 and the PGW 29.

The PGW 29 is connected to the ePDG 28 and connected to the Internet 7 via an SGi interface. The PGW 29 performs, for example, data transfer between the WLAN 6 and the Internet 7.

Wireless communication between the WLAN AP 27 and the UE 2 is done using an SWu interface or an S2c interface. When an SWu interface is used, traffic may directly flow between the WLAN AP 27 and the PGW 29 via an S2a interface and may flow between them via an SWn interface and an S2b interface upon passing through the ePDG 28. When an S2c interface is used, traffic may directly flow between the WLAN AP 27 and the PGW 29 via the S2c interface and may flow between them via the S2c interface upon passing through the ePDG 28.

The UE 2 is a mobile station capable of wirelessly communicating with a wireless base station configuring each network including the E-UTRAN 3, the UTRAN 4, the GSM 5, and the WLAN 6. The UE 2 measures the radio qualities of signals transmitted in a plurality of cells (cells formed by wireless base stations configuring the respective networks) and transmits the measurement results to a communicating wireless base station.

The configurations of the HeNB 11 and the UE 2 will be described below. Since the configurations of other nodes are well known to those skilled in the art and are not directly concerned with the present invention, a description thereof will not be given.

The configuration of the HeNB 11 will be described first.

Figure 2:
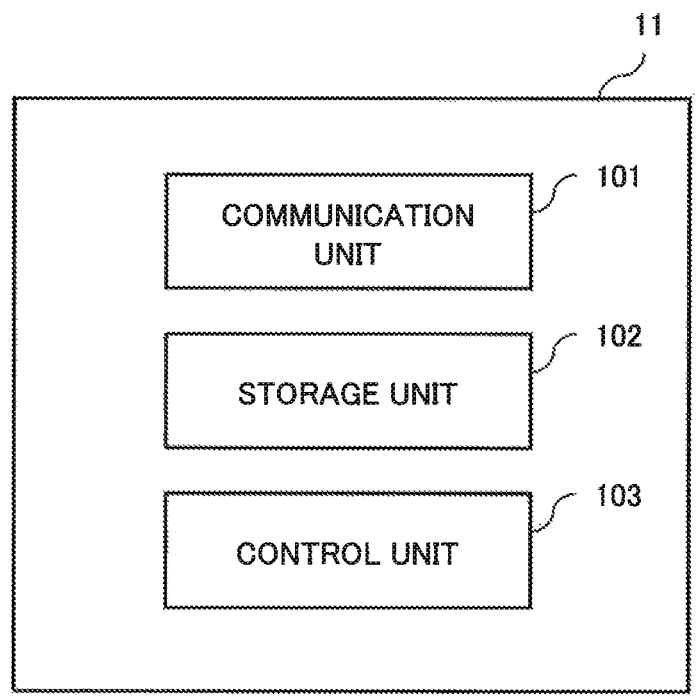
FIG. 2 is a block diagram illustrating the configuration of the main part of an HeNB illustrated in FIG. 1.

FIG. 2 is a block diagram illustrating the configuration of the main part of the HeNB 11.

The HeNB 11 illustrated in FIG. 2 includes a communication unit 101, a storage unit 102, and a control unit 103. The storage unit 102 is an exemplary acquisition unit.

The communication unit 101 wirelessly communicates with the UE 2.

The storage unit 102 stores various types of information. The storage unit 102 further acquires and stores load information related to the load of each network including the E-UTRAN 3, the UTRAN 4, the GSM 5, and the WLAN 6 that are radio access networks and core networks respectively corresponding to them.

The control unit 103 receives information indicating the measurement result of the radio quality of a signal transmitted in each of a plurality of cells and the state of the battery of the UE 2, from the UE 2 via the communication unit 101. The control unit 103 determines a signal, the radio quality of which is to be measured by the UE 2, on the basis of the measurement results of the radio qualities and the state of the battery of the UE 2, indicated in the received information, and the load information stored in the storage unit 102. The control unit 103 transmits a message indicating the signal determined to be measured to the UE 2 via the communication unit 101.

The configuration of the UE 2 will be described below.

Figure 3:
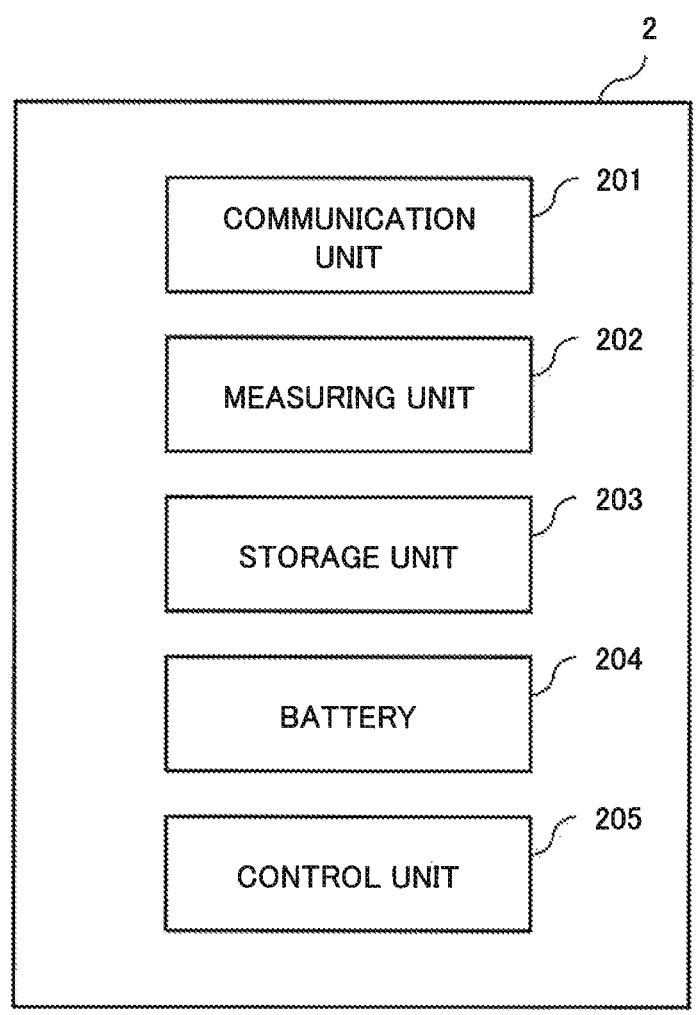
FIG. 3 is a block diagram illustrating the configuration of the main part of a UE illustrated in FIG. 1.

FIG. 3 is a block diagram illustrating the configuration of the main part of the UE 2.

The UE 2 illustrated in FIG. 3 includes a communication unit 201, a measuring unit 202, a storage unit 203, a battery 204, and a control unit 205.

The communication unit 201 wirelessly communicates with wireless base stations (the HeNB 11, the (H)eNBs 13 and 14, the NodeB 19, the HNB 20, the BTS 24, and the WLAN AP 27).

The measuring unit 202 measures the radio quality of a signal transmitted in a plurality of cells (cells formed by wireless base stations configuring the respective networks), which has been received via the communication unit 201.

The storage unit 203 stores various types of information.

The battery 204 supplies power for operating the UE 2.

The control unit 205 transmits information indicating the measurement results of the radio qualities obtained by the measuring unit 202 and the state of the battery 204 to the HeNB 11, via the communication unit 201. Upon receiving a message indicating a signal, the radio quality of which is to be measured, from the HeNB 11 via the communication unit 201, the control unit 205 causes the measuring unit 202 to measure the radio quality of the signal indicated in the received message.

The operations of the HeNB 11 and the UE 2 will be described below.

Figure 4:
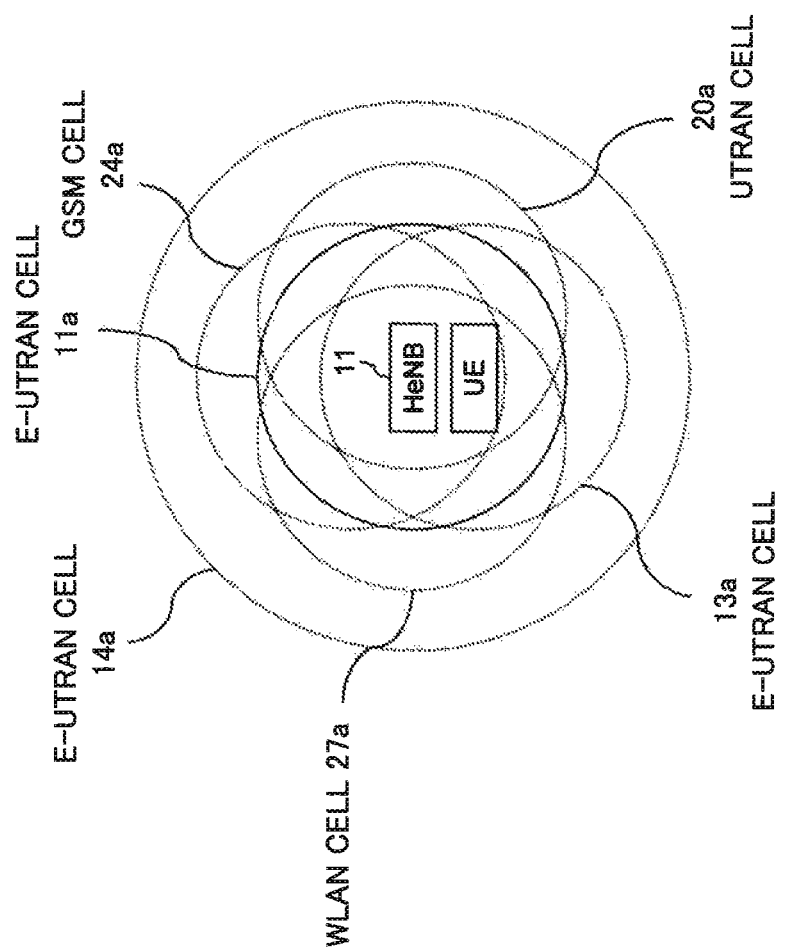
FIG. 4 is a diagram illustrating an exemplary environment to which the present invention is applied.

The following description assumes that the UE 2 camps on an E-UTRAN cell 11a, that is, a cell formed by the HeNB 11 and has established connection (RRC (Radio Resource Control) connection) to the HeNB 11, as illustrated in FIG. 4. Assume again that the UE 2 also camps on cells respectively formed by the (H)eNBs 13 and 14, the HNB 20, the BTS 24, and the WLAN AP 27. The cells formed by the (H)eNBs 13 and 14, the HNB 20, the BTS 24, and the WLAN AP 27 will be referred to as E-UTRAN cells 13a and 14a, a UTRAN cell 20a, a GSM cell 24a, and a WLAN cell 27a, respectively, hereinafter. The following description further assumes that a frequency X is used in the E-UTRAN cell 11a, a frequency Y is used in the E-UTRAN cell 13a, and a frequency Z is used in the E-UTRAN cell 14a.

FIG. 5 is a sequence chart illustrating the operations of the HeNB 11 and the UE 2.

First, the control unit 103 of the HeNB 11 requests a measurement report to the UE 2 via the communication unit 101 (step S11). The control unit 103 requests the measurement of the radio quality of a signal transmitted in each of the E-UTRAN cells 11a, 13a, and 14a, the UTRAN cell 20a, the GSM cell 24a, and the WLAN cell 27a on which the UE 2 camps.

The storage unit 102 acquires and stores load information related to the load of a network in advance. More specifically, the storage unit 102 acquires and stores, for example, load information (load information related to core networks) for the EPC 16, the 3GCN 23, the 2GCN 26, and the ePDG 28 configuring core networks. The storage unit 102 further acquires and stores load information (load information related to radio access networks) for the (H)eNBs 13 and 14, the NodeB 19, the RNC 22, the BTS 24, the BSC 25, the WLAN AP 27, and the like configuring radio access networks.

Specific examples of the load information related to core networks include pieces of information on BHCA (Busy Hour Call Attempts), the number of connections and the like. Specific examples of the load information related to radio access networks include the available radio resources and the capacities of interfaces.

Such load information can be acquired from other wireless base stations, host devices, management devices, or the like. A specific method for acquiring load information is not directly concerned with the present invention and will not be described in detail herein, but the following method is available. For example, a method is available for exchanging pieces of information on available radio resources between radio access networks having different schemes, in accordance with a procedure called RAN Information Management defined in NPL 2. Another method is available for exchanging pieces of information on available radio resources between radio access networks having the same scheme or different schemes, via an X2 interface and Iurh, Iurg, and Iur interfaces and the like that are interfaces between HNBs (not illustrated in FIG. 1).

In response to the request for a measurement report from the HeNB 11, the control unit 205 of the UE 2 causes the measuring unit 202 to measure the radio quality of a signal transmitted in each cell designated in the measurement report. Specific examples of the radio quality include RSRP (Reference Signal Received Power), RSRQ (Reference Signal Received Quality), and Ec/Io (desired signal power/overall received power). The control unit 205 causes the storage unit 203 to store the measurement results obtained by the measuring unit 202. The control unit 205 further measures the state (remaining level) of the battery 204 and causes the storage unit 203 to store the measurement result.

The control unit 205 transmits information indicating the measurement result of the radio quality of each cell and the state (remaining level) of the battery 204, stored in the storage unit 203, to the HeNB 11 via the communication unit 201 as a measurement report (step S13).

FIG. 6 is a view illustrating an exemplary structure of a measurement report.

The UE 2 transmits information obtained by adding a parameter (an area marked with a dotted frame in FIG. 6) stated as batteryLevel to the measurement report (MeasResults Information) defined in 3GPP TS 36.331 v12.1.0. The batteryLevel represents the percentage of the remaining level of the battery 204.

Referring back to FIG. 5, upon receiving the measurement report transmitted from the UE 2 via the communication unit 101, the control unit 103 of the HeNB 11 causes the storage unit 102 to store the received measurement report. The control unit 103 sets the measurement report and the load information stored in the storage unit 102 as inputs to an evaluation function and determines a signal, the radio quality of which is to be measured by the UE 2, on the basis of outputs from the evaluation function.

Figure 7:
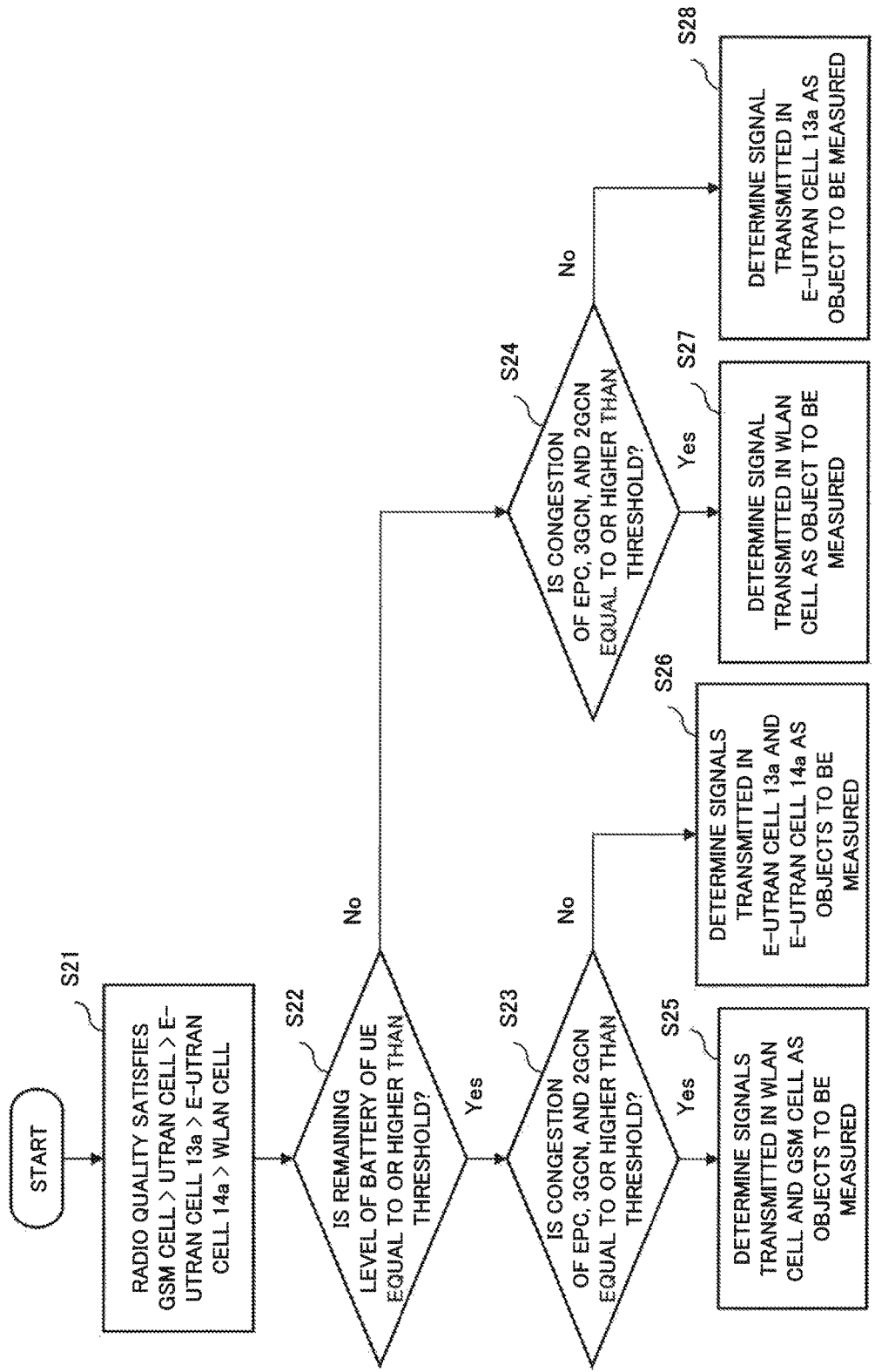
FIG. 7 is a flowchart illustrating the operation of a control unit illustrated in FIG. 2.

FIG. 7 is a flowchart illustrating the operation of the control unit 103 in determining a signal, the radio quality of which is to be measured.

The following description assumes that the load information of core networks stored in the storage unit 102 indicates that the relative magnitude of load descends in the EPC 16, the 3GCN 23, the 2GCN 26, and the ePDG 28 in this order. In other words, the correlation of the load of each node is EPC 16>3GCN 23>2GCN 26>ePDG28. The radio load information of radio access networks stored in the storage unit 102 indicates that the amount of available radio resources ascends in the GSM cell 24a, the UTRAN cell 20a, the E-UTRAN cell 13a, the WLAN cell 27a, and the E-UTRAN cell 14a in this order. In other words, the correlation of the amount of available radio resources is GSM Cell 24a<UTRAN Cell 20a<E-UTRAN Cell 13a<WLAN Cell 27a<E-UTRAN Cell 14a. The following description assumes that the radio quality of each cell satisfies GSM Cell 24a>UTRAN Cell 20a>E-UTRAN Cell 13a>E-UTRAN Cell 14a>WLAN Cell 27a.

If the radio quality of each cell satisfies GSM Cell 24a>UTRAN Cell 20a>E-UTRAN Cell 13a>E-UTRAN Cell 14a>WLAN Cell 27a (step S21), the control unit 103 proceeds to the process in step S22.

The control unit 103 determines in step S22 whether the remaining level of the battery 204 of the UE 2 indicated in the measurement report is equal to or higher than a threshold.

If it is determined that the remaining level of the battery 204 is equal to or higher than the threshold (Yes in step S22), the control unit 103 determines whether the congestion of the EPC 16, the 3GCN 23, and the 2GCN 26 is equal to or higher than a threshold (step S23).

If it is determined that the congestion of the EPC 16, the 3GCN 23, and the 2GCN 26 is equal to or higher than the threshold (Yes in step S23), the control unit 103 proceeds to the process in step S25 (to be described later). If it is determined that the congestion of the EPC 16, the 3GCN 23, and the 2GCN 26 is lower than the threshold (No in step S23), the control unit 103 proceeds to the process in step S26 (to be described later).

If it is determined that the remaining level of the battery 204 is lower than the threshold (No in step S22), the control unit 103 determines whether the congestion of the EPC 16, the 3GCN 23, and the 2GCN 26 is equal to or higher than a threshold (step S24).

If it is determined that the congestion of the EPC 16, the 3GCN 23, and the 2GCN 26 is equal to or higher than the threshold (Yes in step S24), the control unit 103 proceeds to the process in step S27 (to be described later). If it is determined that the congestion of the EPC 16, the 3GCN 23, and the 2GCN 26 is lower than the threshold (No in step S24), the control unit 103 proceeds to the process in step S28 (to be described later).

The process in each of steps S25 to S28 will be described below.

The process in step S25 will be described first.

When the process in step S25 is performed, the remaining level of the battery 204 of the UE 2 is equal to or higher than a threshold (the remaining level has a margin), and the congestion of the EPC 16, the 3GCN 23, and the 2GCN 26 is equal to or higher than a threshold (congested state).

In this case, the control unit 103 determines a signal, the radio quality of which is to be measured by the UE 2, in consideration of followings:

a) the 2GCN 26 is congested, but its degree of congestion is relatively small (load information related to core networks);

b) the ePDG 28 is not congested;

c) the available radio resources are relatively small in the GSM cell 24a, but are relatively large in the WLAN cell 27a (load information related to radio access networks); and d) the radio quality of the GSM cell 24a is relatively good, while the radio quality of the WLAN cell 27a is relatively poor.

In c), the evaluation of the WLAN cell 27a is high (its amount of available radio resources is large), while the evaluation of the GSM cell 24a is low (its amount of available radio resources is small). In d), the evaluation of the GSM cell 24a is high (its radio quality is good), while the evaluation of the WLAN cell 27a is low (its radio quality is poor). Hence, some or all of the evaluations of the WLAN cell 27a and the GSM cell 24a are cancelled out. However, the control unit 103 takes into consideration the fact that the WLAN cell 27a and the GSM cell 24a are evaluated higher than the remaining cells in a) and b) and determines a signal transmitted in the WLAN cell 27a and a signal transmitted in the GSM cell 24a as signals, the radio qualities of which are to be measured. The control unit 103 causes the storage unit 102 to store information indicating that these signals have been determined as signals, the radio qualities of which are to be measured by the UE 2. The above-mentioned determination logic is merely an example, and the control unit 103 may determine a signal, the radio quality of which is to be measured by the UE 2, in accordance with other types of determination logic.

The process in step S26 will be described next.

When the process in step S26 is performed, the remaining level of the battery 204 of the UE 2 is equal to or higher than a threshold (the remaining level has a margin), and the congestion of the EPC 16, the 3GCN 23, and the 2GCN 26 is lower than a threshold (non-congested state).

In this case, the control unit 103 determines a signal, the radio quality of which is to be measured by the UE 2, in consideration of following a) to c):

a) the EPC 16 is not congested;

b) the E-UTRAN cell 13a and the E-UTRAN cell 14a have a certain amount of available radio resources or more (load information related to radio access networks); and c) the radio qualities of the E-UTRAN cell 13a and the E-UTRAN cell 14a are relatively not poor.

In a), the GSM cell 24a and the E-UTRAN cells 13a and 14a have the same evaluation in terms of "not congested." In b), the E-UTRAN cell 13a and the E-UTRAN 14a are evaluated higher (their amounts of available radio resources are larger) than the GSM cell 24a. In c), the GSM cell 24a and the E-UTRAN cell 13a and the E-UTRAN cell 14a have the same evaluation in terms of "relatively not poor." As a result of taking these facts into consideration, the control unit 103 determines a signal having the frequency Y transmitted in the E-UTRAN cell 13a and a signal having the frequency Z transmitted in the E-UTRAN cell 14a as signals, the radio qualities of which are to be measured. The control unit 103 causes the storage unit 102 to store information indicating that these signals have been determined as signals, the radio qualities of which are to be measured by the UE 2. The above-mentioned determination logic is merely an example, and the control unit 103 may determine a signal, the radio quality of which is to be measured by the UE 2, in accordance with other types of determination logic.

The process in step S27 will be described next.

When the process in step S27 is performed, the remaining level of the battery 204 of the UE 2 is lower than a threshold (the remaining level has no margin), and the congestion of the EPC 16, the 3GCN 23, and the 2GCN 26 is equal to or higher than a threshold (congested state).

In this case, the control unit 103 determines a signal, the radio quality of which is to be measured by the UE 2, in consideration of following a) to e):

a) the 2GCN 26 is congested, but its degree of congestion is relatively small (load information related to core networks);

b) the ePDG 28 is not congested;

c) the amount of available radio resources is relatively small in the GSM cell 24a, but is relatively large in the WLAN cell 27a (load information related to radio access networks);

d) the radio quality of the GSM cell 24a is relatively good, while the radio quality of a WLAN cell 27a is relatively not good; and e) since the remaining level of the battery 204 has no margin, signals to be measured need to be narrowed down as much as possible.

The control unit 103 weights c) and e), among above-mentioned a) to e), in the evaluation function and determines a signal, the radio quality of which is to be measured by the UE 2. As a result, the control unit 103 determines a signal transmitted in the WLAN cell 27a as an object, the radio quality of which is to be measured. The control unit 103 causes the storage unit 102 to store information indicating that the signal transmitted in the WLAN cell 27a has been determined as a signal, the radio quality of which is to be measured by the UE 2.

The process in step S28 will be described next.

When the process in step S28 is performed, the remaining level of the battery 204 of the UE 2 is lower than a threshold (the remaining level has no margin), and the congestion of the EPC 16, the 3GCN 23, and the 2GCN 26 is lower than a threshold (non-congested state).

In this case, the control unit 103 determines a signal, the radio quality of which is to be measured by the UE 2, in consideration of following a) to d):

a) the EPC 16 is not congested;

b) the E-UTRAN cell 13a and the E-UTRAN cell 14a have a certain amount of available radio resources or more (load information related to radio access networks);

c) the radio qualities of the E-UTRAN cell 13a and the E-UTRAN cell 14a are relatively not poor, and the radio quality of the E-UTRAN cell 13a is better than that of the E-UTRAN cell 14a; and d) since the remaining level of the battery 204 has no margin, signals to be measured need to be narrowed down as much as possible.

The control unit 103 weights c) and d), among above-mentioned a) to d), in the evaluation function and determines a signal, the radio quality of which is to be measured by the UE 2. As a result, the control unit 103 determines a signal having the frequency Y transmitted in the E-UTRAN cell 13a as a signal, the radio quality of which is to be measured. The control unit 103 causes the storage unit 102 to store information indicating that the signal having the frequency Y transmitted in the E-UTRAN cell 13a has been determined as a signal, the radio quality of which is to be measured by the UE 2.

FIG. 7 illustrates an exemplary operation of the control unit 103 when the radio quality of each cell satisfies GSM Cell 24a>UTRAN Cell 20a>E-UTRAN Cell 13a>E-UTRAN Cell 14a>WLAN Cell 27a. The control unit 103 determines a signal, the radio quality of which is to be measured by the UE 2, in accordance with determination logic which takes the state of the battery of the UE 2 into consideration as well, for each state of the radio quality of each cell.

Referring back to FIG. 5, the control unit 103 gives a notification of the signal that has been determined as a signal, the radio quality of which is to be measured by the UE 2, and stored in the storage unit 102, via the communication unit 101 (step S15). In other words, the control unit 103 transmits a message indicating the communication scheme and frequency of the signal determined as an object, the radio quality of which is to be measured, to the UE 2 via the communication unit 101.

Upon being notified the signal, the radio quality of which is to be measured, via the communication unit 201, the control unit 205 of the UE 2 causes the measuring unit 202 to measure the radio quality of the notified signal (step S16).

FIG. 8 is a diagram illustrating objects, the radio qualities of which are to be measured by the UE 2, before and after the notification is given from the HeNB 11. Referring to FIG. 8, a signal transmitted in the WLAN cell 27*a* and a signal transmitted in the GSM cell 24*a* are assumed to be notified as signals, the radio qualities of which are to be measured.

Before giving the notification from the HeNB 11, the UE 2 measures the radio qualities of each of the E-UTRAN cells 11*a*, 13*a*, and 14*a*, the UTRAN cell 20*a*, the GSM cell 24*a*, and the WLAN cell 27*a*, as illustrated in FIG. 8. On the other hand, after giving the notification from the HeNB 11, the UE 2 measures the radio qualities of only the GSM cell 24*a* and the WLAN cell 27*a*. This can reduce the number of signals, the radio qualities of which are to be measured, thus the increase of the power consumption of the UE 2 can be suppressed.

In this manner, according to the present exemplary embodiment, the HeNB 11 includes a communication unit 101 which communicates with the UE 2, a storage unit 102 which acquires and stores load information for a network, and a control unit 103. The control unit 103 receives information indicating the measurement results of the radio qualities of a plurality of cells and the state of the battery 204 of the UE 2 from the UE 2, and determines a signal, the radio quality of which is to be measured by the UE 2, on the basis of the measurement results of the radio qualities, the state of the battery 204, and the load information. The control unit 103 notifies the signal determined to be measured to the UE 2.

The increase of the power consumption of the UE 2 can be suppressed by controlling an object, the radio quality of which is to be measured by the UE 2, in consideration not only of the state of the battery 204 of the UE 2 but also of the network load.

Controlling an object, the radio quality of which is to be measured, in consideration of the network load, allows the use of a signal in a cell provided with available radio resources in large amounts as an object, the radio quality of which is to be measured, to improve the rate of handover success of the UE 2.

Controlling an object, the radio quality of which is to be measured, in consideration of the network load allows selection of a cell in a network having less load than other networks as a connection destination to improve the throughput.

Setting only some of signals among signals in a plurality of cells having different communication schemes or frequencies as objects to be measured can lead to the suppression of the interference to improve the throughput of the entire wireless communication system 1.

The wireless communication system 1 has been described by taking one equipped with the E-UTRAN 3, the UTRAN 4, the GSM 5, and the WLAN 6 as an example in the present exemplary embodiment, the present invention is not limited to this, and the wireless communication system 1 may be equipped with only some of the above-mentioned plurality of networks. The wireless communication system 1 may be equipped with, for example, only the GSM 5 and the WLAN 6.

Second Exemplary Embodiment

Figure 9:
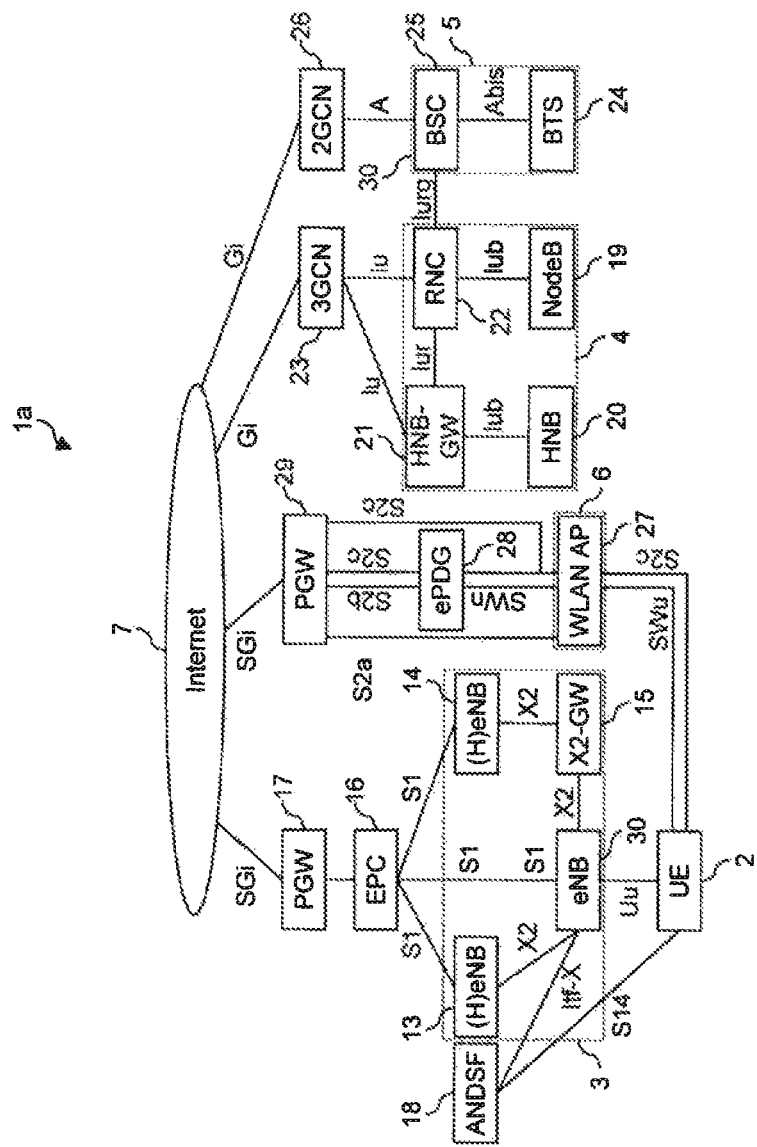
FIG. 9 is a diagram illustrating the configuration of a wireless communication system according to a second exemplary embodiment of the present invention.

FIG. 9 is a diagram illustrating the configuration of a wireless communication system 1*a* according to a second exemplary embodiment of the present invention.

The wireless communication system 1*a* according to the present exemplary embodiment is different from the wireless communication system 1 according to the first exemplary embodiment in that in the former the HeNB 11 and the HeNB-GW 12 are omitted and an eNB 30 is added.

The eNB 30 is a wireless base station forming a cell. The eNB 30 wirelessly communicates with a UE 2 camping on the cell formed by the eNB 30, using the LTE scheme. Assume herein that in the present exemplary embodiment, CA is performed between the eNB 30 and the UE 2.

The configuration of the eNB 30 will be described below.

Figure 10:
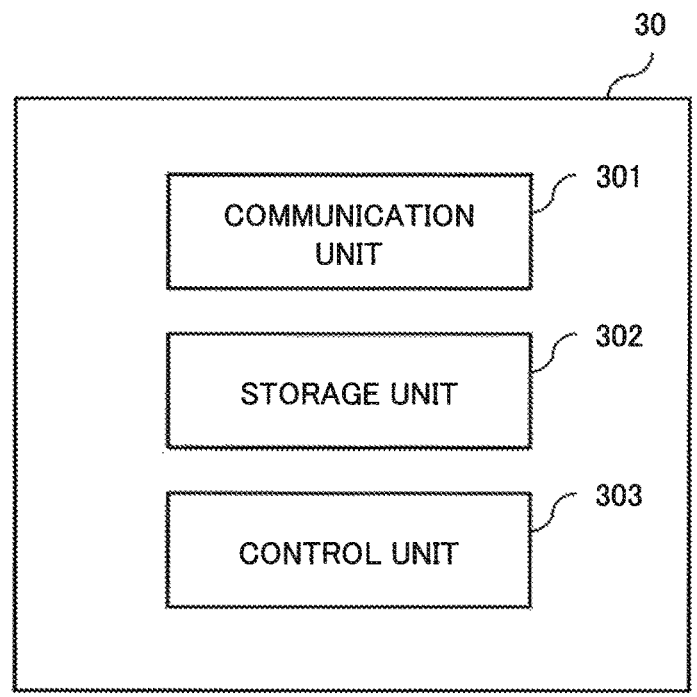
FIG. 10 is a block diagram illustrating the configuration of the main part of an eNB illustrated in FIG. 9.

FIG. 10 is a block diagram illustrating the configuration of the main part of the eNB 30.

The eNB 30 illustrated in FIG. 10 includes a communication unit 301, a storage unit 302, and a control unit 303. The storage unit 302 is an exemplary acquisition unit.

The communication unit 301 wirelessly communicates with the UE 2.

The storage unit 302 stores various types of information such as load information.

The control unit 303 receives information indicating the measurement results of the radio qualities and the state of a battery 204 of the UE 2 from the UE 2 via the communication unit 301. The control unit 303 determines a CC, the radio quality of which is to be measured by the UE 2, on the basis of the measurement results of the radio qualities and the state of the battery 204 of the UE 2, indicated in the received information, and the load information stored in the storage unit 302. The control unit 303 transmits a message indicating the CC determined to be measured to the UE 2 via the communication unit 301.

The operations of the eNB 30 and the UE 2 will be described below.

Figure 11:
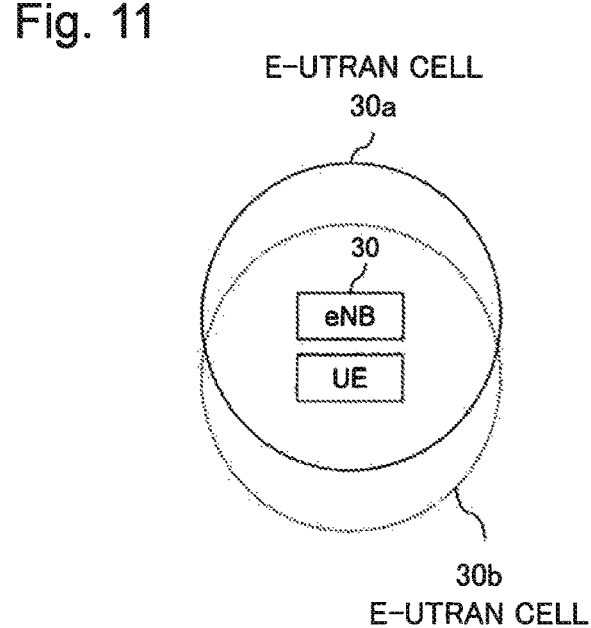
FIG. 11 is a diagram illustrating an exemplary environment to which the present invention is applied.

The following description assumes that the eNB 30 forms an E-UTRAN cell 30*a* which uses a frequency band A including two CCs that are unit frequency bands, and an E-UTRAN cell 30*b* which uses a frequency band B including three CCs, as illustrated in FIG. 11. Assume again that the UE 2 camps on the E-UTRAN cell 30*a* and has established RRC connection, but it is also included in the coverage of the E-UTRAN cell 30*b*.

Figure 12:
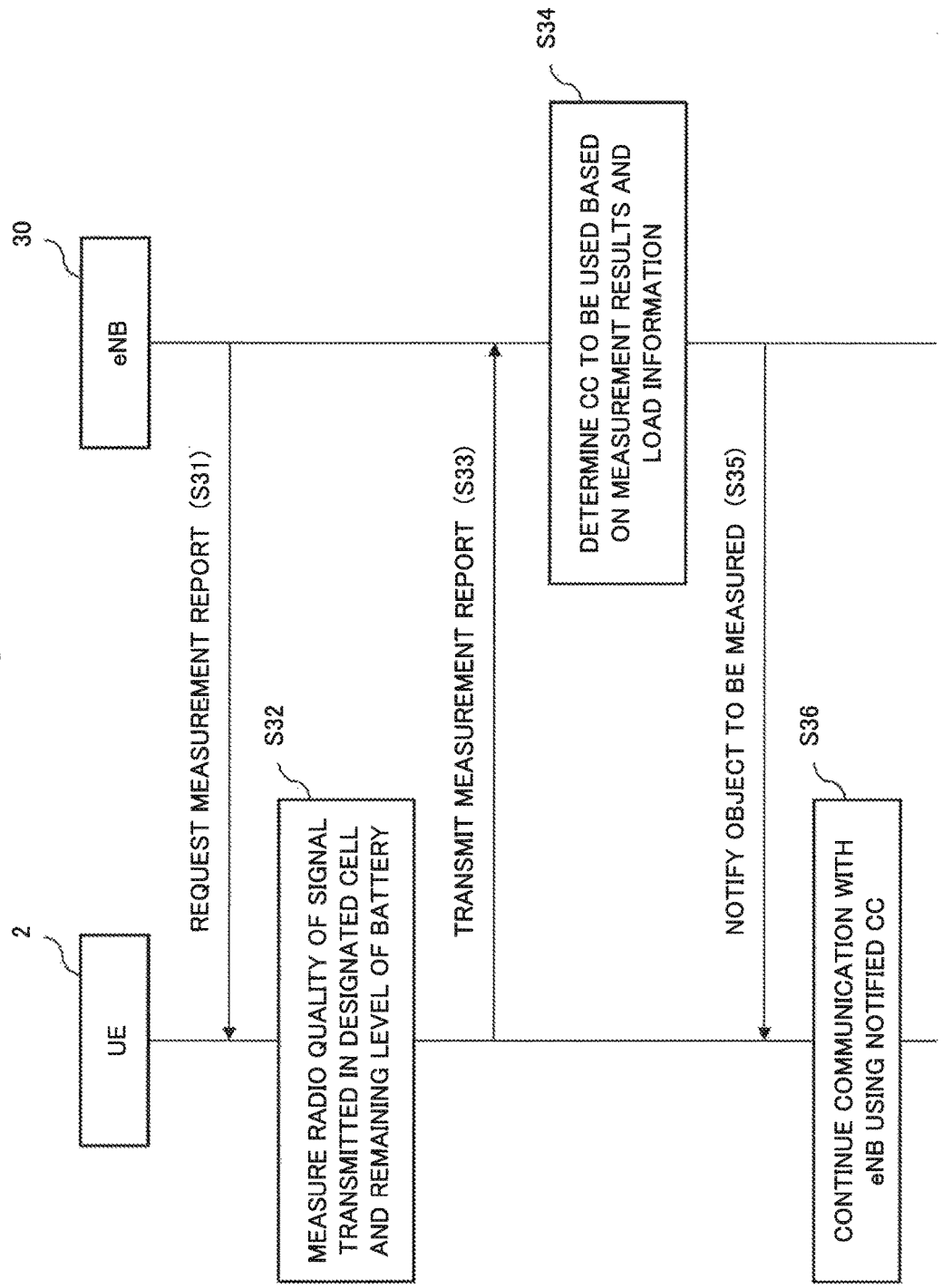
FIG. 12 is a sequence chart illustrating the operations of the eNB and the UE illustrated in FIG. 9.

FIG. 12 is a sequence chart illustrating the operations of the eNB 30 and the UE 2.

First, the control unit 303 of the eNB 30 requests a measurement report to the UE 2 via the communication unit 301 (step S31). The control unit 303 requests the measurement of the radio qualities of the E-UTRAN cells 30*a* and 30*b*. The storage unit 302 acquires and stores load information in advance. Since the details of load information to be acquired and the method for acquiring load information are the same as those in the first exemplary embodiment, a description thereof will be omitted.

In response to the request for a measurement report from the eNB 30, a control unit 205 of the UE 2 causes a measuring unit 202 to measure the radio qualities of signals transmitted in the E-UTRAN cells 30*a* and 30*b* designated in the measurement report (step S32). A frequency band A including two CCs is used in the E-UTRAN cell 30*a*, and a frequency band B including three CCs is used in the E-UTRAN cell 30b, as described above. The measuring unit 202 measures radio quality for each CC in the frequency band of each cell.

The control unit 205 causes the storage unit 203 to store the measurement results (the radio quality of each cell) obtained by the measuring unit 202. The control unit 205 further measures the state (remaining level) of the battery 204 and causes the storage unit 203 to store the measurement result.

The control unit 205 transmits information indicating the measurement result of the radio quality of each cell and the state (remaining level) of the battery 204, stored in the storage unit 203, to the eNB 30 via a communication unit 201 as a measurement report (step S33). The control unit 205 transmits information obtained by adding a parameter stated as batteryLevel representing the percentage of the remaining level of the battery 204 to the measurement report (Meas-Results Information) of the radio qualities, as in the first exemplary embodiment.

Upon receiving the measurement report transmitted from the UE 2 via the communication unit 301, the control unit 303 of the eNB 30 causes the storage unit 302 to store the received measurement report. The control unit 303 determines a CC to be used by the UE 2, on the basis of the measurement report and the load information stored in the storage unit 302. When, for example, the remaining level of the battery 204 of the UE 2 is low, the control unit 303 determines to cause the UE 2 to use not the CCs included in the frequency band B used in the E-UTRAN cell 30b but only one CC included in the frequency band A used in the E-UTRAN cell 30a. Further, when, for example, the radio quality of the E-UTRAN cell 30b is poor, or a few radio resources are available in the E-UTRAN cell 30b, the control unit 303 determines not to cause the UE 2 to use the CCs included in the frequency band B.

The control unit 303 determines the CC determined to be used by UE 2 as a CC, the radio quality of which is to be measured by the UE 2, and causes storage unit 302 to store the CC.

The control unit 303 notifies the CC that has been determined as an object, the radio quality of which is to be measured by the UE 2, and stored in the storage unit 302, via the communication unit 301 (step S35). In other words, the control unit 303 transmits a message indicating the CC determined as an object, the radio quality of which is to be measured, to the UE 2 via the communication unit 301.

Upon being notified the CC, the radio quality of which is to be measured, via the communication unit 201, the control unit 205 of the UE 2 causes the storage unit 203 to store the notified CC. The control unit 205 causes the measuring unit 202 to measure the radio quality of the CC stored in the storage unit 203. The control unit 205 further causes the communication unit 201 to continue communication with the eNB 30 using the CC stored in the storage unit 203.

In this manner, according to the present exemplary embodiment, the eNB 30 includes a communication unit 301 which communicates with the UE 2, a storage unit 302 which acquires and stores load information for a network, and a control unit 303. When CA is performed, the control unit 303 receives information indicating the measurement results of the radio qualities of cells and the state of the battery 204 from the UE 2, and determines a CC, the radio quality of which is to be measured by the UE 2, on the basis of the measurement results of the radio qualities, the state of the battery 204, and the load information. The control unit 303 notifies the CC determined to be measured to the UE 2.

The increase in the power consumption of the UE 2 can be attempted to be suppressed by controlling a CC, the radio quality of which is to be measured by the UE 2, in consideration not only of the state of the battery 204 of the UE 2 but also of the network load.

Setting only some of CCs among CCs used in CA as objects to be measured can result in the suppression of the interference to improve the throughput of the entire wireless communication system 1a.

Third Exemplary Embodiment

Figure 13:
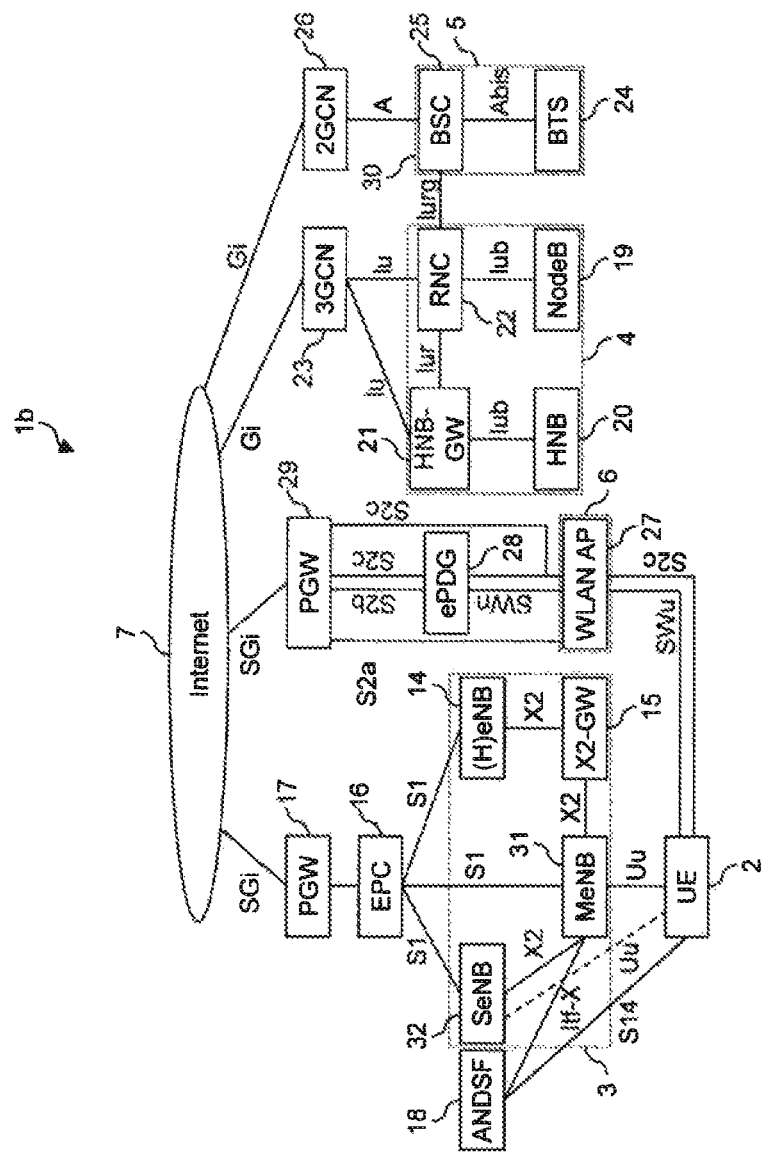
FIG. 13 is a diagram illustrating the configuration of a wireless communication system according to a third exemplary embodiment of the present invention.

FIG. 13 is a diagram illustrating the configuration of a wireless communication system 1b according to a third exemplary embodiment of the present invention. The wireless communication system 1b according to the present exemplary embodiment is different from the wireless communication system 1a according to the second exemplary embodiment in that in the former the eNB 30 is replaced with an eNB 31 and the (H)eNB 13 is replaced with an eNB 32.

The eNBs 31 and 32 are wireless base stations forming cells. The eNBs 31 and 32 wirelessly communicate with a UE 2 camping on the cells formed by the eNBs 31 and 32, via Uu interfaces using the LTE scheme. Assume herein that in the present exemplary embodiment, the UE 2 is simultaneously connected to the eNBs 31 and 32, the eNB 31 serves as an MeNB, the eNB 32 serves as an SeNB, and DC is performed. The eNB 31 will be referred to as an MeNB 31 and the eNB 32 will be referred to as an SeNB 32 hereinafter.

The configuration of the MeNB 31 will be described below. Since the configuration of the SeNB 32 is the same as that of the MeNB 31, a description thereof will not be given.

Figure 14:
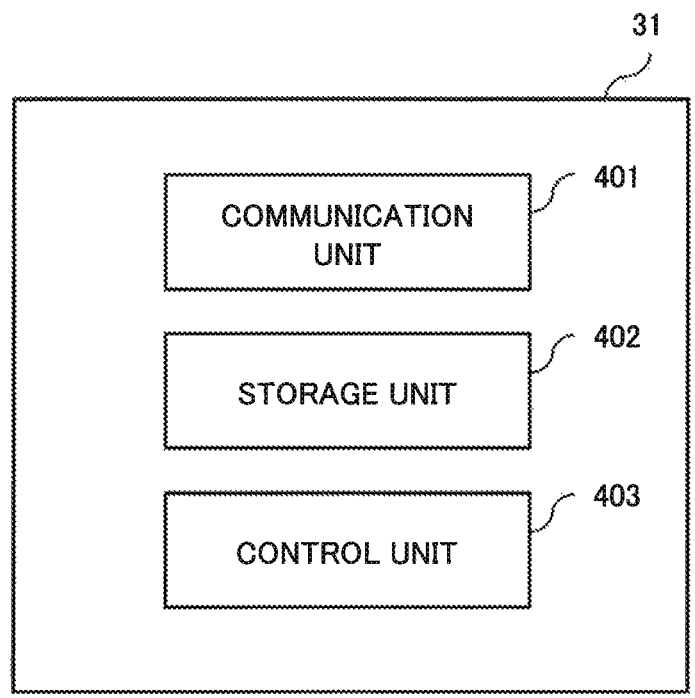
FIG. 14 is a block diagram illustrating the configuration of the main part of an MeNB illustrated in FIG. 13.

FIG. 14 is a block diagram illustrating the configuration of the main part of the MeNB 31.

The MeNB 31 illustrated in FIG. 14 includes a communication unit 401, a storage unit 402, and a control unit 403. The storage unit 402 is an exemplary acquisition unit.

The communication unit 401 wirelessly communicates with the UE 2.

The storage unit 402 stores various types of information such as load information.

The control unit 403 receives information indicating the measurement results of the radio qualities and the state of a battery 204 of the UE 2 from the UE 2 via the communication unit 401. The control unit 403 determines a signal, the radio quality of which is to be measured by the UE 2, on the basis of the measurement results of the radio qualities and the state of the battery 204 of the UE 2, indicated in the received information, and the load information stored in the storage unit 402. The control unit 403 transmits a message indicating the signal determined to be measured to the UE 2 via the communication unit 401.

The operations of the MeNB 31 and the UE 2 will be described below.

Figure 15:
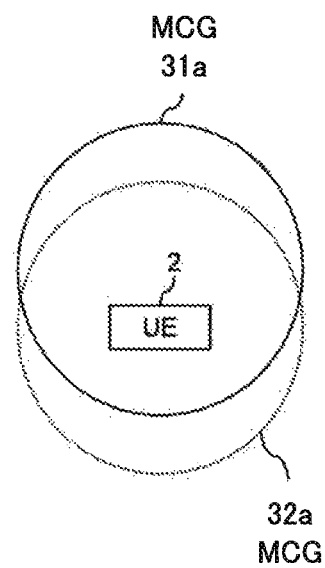
FIG. 15 is a diagram illustrating an exemplary environment to which the present invention is applied.

The following description assumes that the MeNB 31 forms a serving cell group (to be referred to as an MCG: Master Cell Group hereinafter) 31a, as illustrated in FIG. 15. Assume again that the SeNB 32 forms a serving cell group (to be referred to as an SCG: Secondary Cell Group hereinafter) 32a. Assume further that the UE 2 is located within both the coverage of the MCG 31a and the coverage of the SCG 32a, has established connection to the MeNB 31 and the SeNB 32, and performs DC. The following description even assumes that a frequency α is used in the MCG 31a and a frequency β is used in the SCG 32a.

Figure 16:
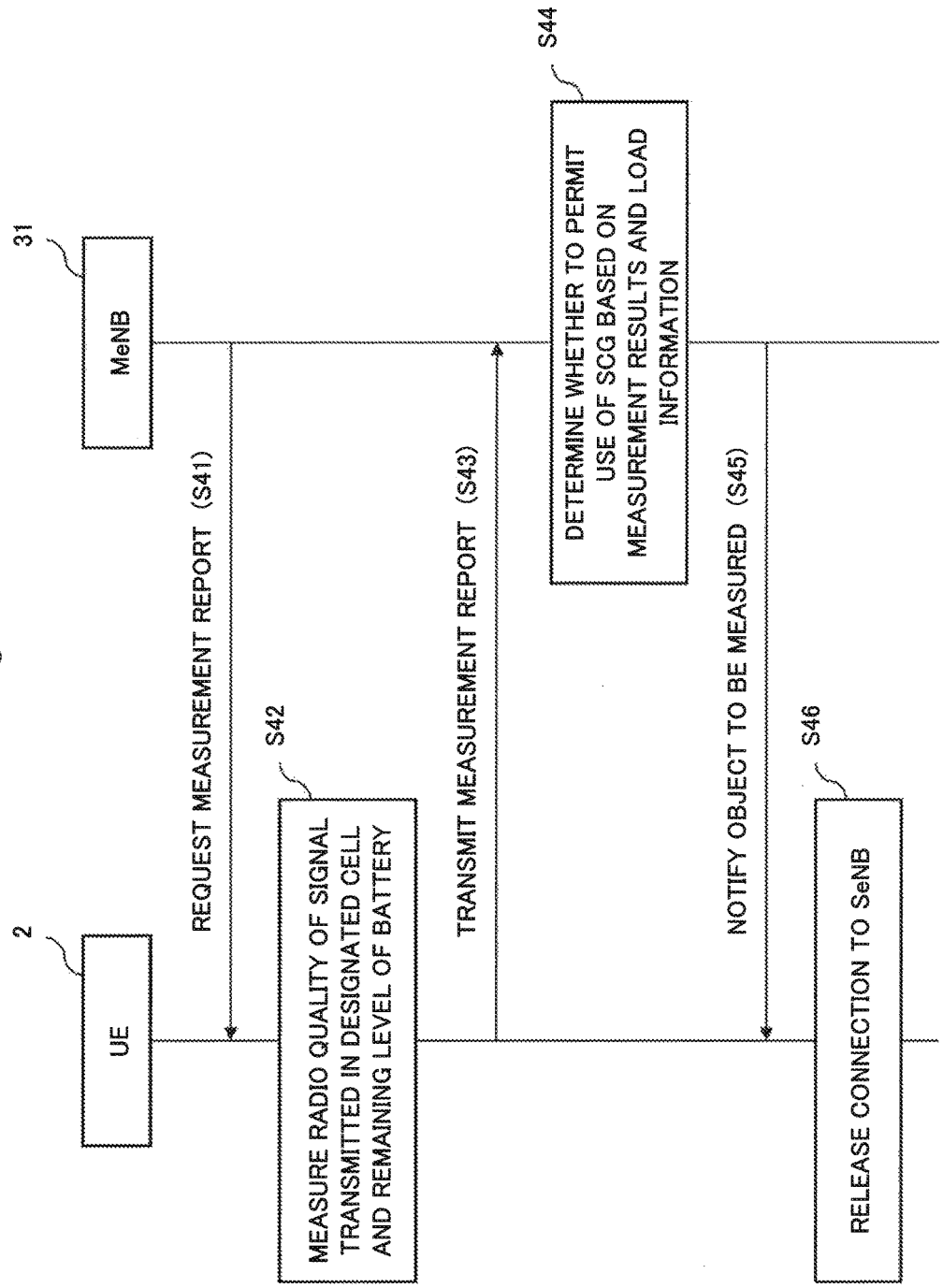
FIG. 16 is a sequence chart illustrating the operations of the MeNB and the UE illustrated in FIG. 13.

FIG. 16 is a sequence chart illustrating the operations of the MeNB 31 and the UE 2.

First, the control unit 403 of the MeNB 31 requests a measurement report to the UE 2 via the communication unit 401 (step S41). The control unit 403 requests the measurement of the radio qualities of signals transmitted in the MCG 31a and the SCG 32a. The storage unit 402 acquires and stores load information in advance. Since the details of load information to be acquired and the method for acquiring load information are the same as those in the first exemplary embodiment, a description thereof will not be given.

In response to the request for a measurement report from the MeNB 31, a control unit 205 of the UE 2 causes a measuring unit 202 to measure the radio qualities of signals transmitted in the MCG 31a and the SCG 32a designated in the measurement report (step S42).

The control unit 205 causes the storage unit 203 to store the measurement results (the radio qualities of signals transmitted in the MCG 31a and the SCG 32a) obtained by the measuring unit 202. The control unit 205 further measures the state (remaining level) of the battery 204 and causes the storage unit 203 to store the measurement result.

The control unit 205 transmits information indicating the measurement results of the radio qualities and the state (remaining level) of the battery 204, stored in the storage unit 203, to the MeNB 31 via a communication unit 201 as a measurement report (step S43). The control unit 205 transmits information obtained by adding a parameter stated as batteryLevel representing the percentage of the remaining level of the battery 204 to the measurement report (MeasResults Information) of the radio qualities, as in the first exemplary embodiment.

Upon receiving the measurement report transmitted from the UE 2 via the communication unit 401, the control unit 403 of the MeNB 31 causes the storage unit 402 to store the received measurement report. The control unit 403 determines whether to permit the UE 2 to use the SCG 32a, on the basis of the measurement report and the load information stored in the storage unit 402. When, for example, the remaining level of the battery 204 is low, or a few radio resources are available in the SCG 32a, the control unit 403 determines not to permit the UE 2 to use the SCG 32a. When, for example, the UE 2 performs DC and utilizes a service which requires less pieces of data to be transmitted and received, such as VoLTE (Voice over LTE), there is no problem even if both control data and user data may be exchanged with the MeNB 31. This obviates the need to transmit ACK/NACK to both the MeNB 31 and the SeNB 32 and measure radio quality in the MCG 31a and the SCG 32a, thus the power consumption of the UE 2 can be attempted to be reduced.

When the control unit 403 determines not to permit the use of the SCG 32a, the control unit 403 causes the storage unit 402 to store information indicating that the use of the SCG 32a is not permitted and information indicating that a signal having the frequency α transmitted in the MCG 31a has been determined as a signal, the radio quality of which is to be measured by the UE 2. When the control unit 403 determines to permit the use of the SCG 32a, the control unit 403 causes the storage unit 402 to store information indicating that a signal having the frequency α transmitted in the MCG 31a and a signal having the frequency β transmitted in the SCG 32a have been determined as signals, the radio qualities of which are to be measured by the UE 2.

The control unit 403 notifies the signals that have been determined as objects, the radio qualities of which are to be measured by the UE 2, and stored in the storage unit 402, via the communication unit 401 (step S45). More specifically, when the control unit 403 determines to permit the use of the SCG 32a, the control unit 403 transmits a message indicating a signal having the frequency α transmitted in the MCG 31a and a signal having the frequency β transmitted in the SCG 32a, which are determined as objects, the radio qualities of which are to be measured. When the control unit 403 determines not to permit the use of the SCG 32a, the control unit 403 transmits a message indicating a signal that has the frequency α transmitted in the MCG 31a and has been determined as an object, the radio quality of which is to be measured, and indicating that the use of the SCG 32a is not permitted. The following description assumes that the control unit 403 has determined not to permit the use of the SCG 32a.

Upon being notified the signal, the radio quality of which is to be measured (the signal having the frequency α transmitted in the MCG 31a), via the communication unit 201, the control unit 205 causes the storage unit 203 to store the notified signal. Since the control unit 205 is notified that the use of the SCG 32a is not permitted, the control unit 205 causes the storage unit 203 to store information indicating that the SCG 32a is not used. The control unit 205 causes the communication unit 201 to release connection with the SeNB 32 and causes the measuring unit 202 to measure the radio quality of the signal having the frequency α transmitted in the MCG 31a.

In this manner, according to the present exemplary embodiment, the MeNB 31 includes a communication unit 401 which communicates with the UE 2, a storage unit 402 which acquires and stores load information for a network, and a control unit 403. The control unit 403 receives information indicating the measurement results of the radio qualities of the MCG 31a and the SCG 32a and the state of the battery 204 of the UE 2 from the UE 2, and determines whether to permit the use of the SCG 32a, on the basis of the measurement results of the radio qualities, the state of the battery 204, and the load information. The control unit 403 determines a signal, the radio quality of which is to be measured by the UE 2, in accordance with the above-mentioned determination, and notifies the signal determined to be measured to the UE 2.

The increase in the power consumption of the UE 2 can be attempted to be suppressed by determining whether to permit the use of the SCG 32a, in consideration not only of the state of the battery 204 of the UE 2 but also of the network load, and determining a signal, the radio quality of which is to be measured by the UE 2, in accordance with the above-mentioned determination.

Reducing the frequency bands of signals to be measured by the UE 2 can lead to the suppression of the interference to improve the throughput of the entire wireless communication system 1b.

Figure 17:
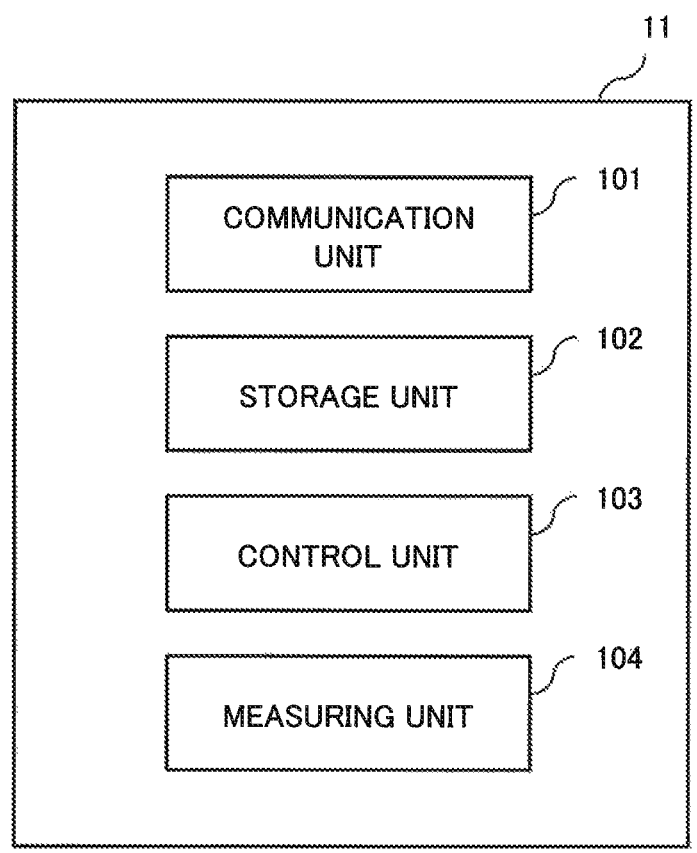
FIG. 17 is a block diagram illustrating another configuration of a wireless base station according to the present invention.

Although the HeNB 11 has been described by taking one which acquires the measurement results of the radio qualities from the UE 2 as an example in the first exemplary embodiment, the present invention is not limited to this. As a modification, the HeNB 11 may include a measuring unit 104 which measures the radio quality of the cell of each network, and the control unit 103 may acquire the measurement results of the radio qualities from the measuring unit 104, as illustrated in FIG. 17.

Although the HeNB 11 has been described by taking one which transmits a measurement request to the UE 2 which has established RRC connection as an example in the first exemplary embodiment, the present invention is not limited to this. As a modification, the HeNB 11 may use information indicating the cell formed by the HeNB 11 to transmit a measurement request even to a UE which camps on the cell and has not established RRC connection.

In the first exemplary embodiment, the HeNB 11 may determine whether the WLAN cell 27*a* has been registered as a cell adjacent to the cell formed by the HeNB 11, in accordance with the O&M (Operation & Maintenance) procedure. The HeNB 11 may set a signal transmitted in the WLAN cell 27*a* as an object to be measured when the WLAN cell 27*a* has been registered, and may not set the signal transmitted in the WLAN cell 27*a* as an object to be measured when the WLAN cell 27*a* has not been registered.

Although an example in which an object, the radio quality of which is to be measured by the UE 2, is determined in consideration of the load of core networks and radio access networks has been used for description in the first to third exemplary embodiments, the present invention is not limited to this. As a modification, the load of interfaces between wireless base stations, such as an X2 interface used during a handover, the load of the CPU (Central Processing Unit) of a wireless base station forming a cell which may serve as a handover destination, and the like may be taken into consideration. When these loads are high, the rate of handover success lowers. Therefore, the number of trials of handovers to cells having low rates of handover success can be reduced by not setting signals transmitted in cells formed by wireless base stations which require interfaces to be connected or CPUs having high loads as objects, the radio qualities of which are to be measured.

As another modification, the type of service utilized may be set as input to the evaluation function. For example, a signal in the GSM cell 24*a* or the UTRAN cell 20*a* may be used as an object to be measured when a voice call is utilized, and a signal in the E-UTRAN cell 13*a* or 14*b* may be used as an object to be measured when a streaming service for viewing contents is utilized.

As still another modification, the HeNB 11 may receive via an ltf-X interface, data (for example, a policy) provided to the UE 2 by the ANDSF 18 and set the data as input to the evaluation function.

In the second exemplary embodiment, when the remaining level of the battery 204 has a margin, the number of CCs used by the UE 2 may be increased. In the third exemplary embodiment, when the remaining level of the battery 204 comes to have a margin after the determination of not to permit the use of the SCG 32*a*, the use of the SCG 32*a* may be permitted. The throughput can be improved by increasing the number of CCs used by the UE 2 or permitting the use of the SCG 32*a*.

Although an example in which a parameter stated as batteryLevel representing the percentage of the remaining level of the battery 204 is used as information on the state of the battery 204 has been used for description in the first to third exemplary embodiments, the present invention is not limited to this. As a modification, the absolute value (for example, the discharge capacity (mAh) or the predicted value of the endurance time) of the remaining level of the battery 204, the date of manufacture, the type, the model number, or the like may be used as information pertaining to the state of the battery 204. IMEISV (International Mobile Equipment Identifier Software Version) including, for example, the manufacturer, the model, the serial number, and the software revision of the UE 2 may be set as input to the evaluation function.

For example, even if the absolute value of the remaining level of the battery 204 has a margin, when the model, the date of manufacture, the serial number, or the software revision reveals that the UE 2 is an old product and consumes much power, the remaining level of the battery 204 may be evaluated lower, or the like.

Although the UE 2 has been described by taking one which reports information pertaining to the state of the battery 204 together with the measurement results of the radio qualities in response to the reception of a measurement request from the wireless base station as an example in the first to third exemplary embodiments, the present invention is not limited to this. As a modification, the UE 2 may transmit information pertaining to the state of the battery 204 in response to the trigger that the remaining level of the battery 204 becomes equal to or higher than a predetermined threshold or becomes equal to or lower than a predetermined threshold.

Although an example in which information ("batteryLevel") pertaining to the state of the battery 204 is notified from the UE 2 to the wireless base station has been used for description in the first to third exemplary embodiments, the present invention is not limited to this. When the present invention is applied to a UTRAN, a parameter (an area marked with a dotted frame in FIG. 18) stated as batteryLevel may be added to a message defined in 3GPP TS 25.331 v12.1.0, as illustrated in FIG. 18.

Although the first exemplary embodiment has been described in conjunction with LTE, the present invention may be applied to other networks such as a UTRAN, a GSM, a WLAN, and a CDMA (Code Division Multiple Access) 2000.

In the first to third exemplary embodiments, when MIMO (Multi input Multi Output) is used, the number of antennas used may be decreased in accordance with output from the evaluation function. This can reduce the power consumption of the UE 2.

A technique called 3D beamforming is under study in LTE-Advanced. In this technique, interference between cells is reduced by horizontal and vertical beamforming and another beam is formed between the UEs 2 in the same cell. In the first to third exemplary embodiments, when 3D beamforming is used, the shape of a beam to be generated may be controlled in accordance with the output from the evaluation function. For example, the beam may be shaped thick when the remaining level of the battery 204 is high, and the beam may be shaped small when the remaining level of the battery 204 is low. This can reduce the power consumption of the UE 2.

Although the UE 2 has been described by taking one which releases connection to the SeNB 32 and continues communication with the MeNB 31 as an example in the third exemplary embodiment, the present invention is not limited to this. As a modification, the UE 2 may release connection between the MeNB 31 and the UE 2 and continue connection to the SeNB 32.

Although the UE 2 has been described by taking one which performs processing according to a message for notifying a signal to be measured, upon receiving the message, as an example in the first to third exemplary embodiments, the present invention is not limited to this. For example, the wireless base station incorporates a timer into a message, then the UE 2 receives the message, thereafter may start the timer, and when the timer terminates, the UE 2 may perform processing according to the message. Further, the wireless base station incorporates a timer and the threshold of a counter into a message. The UE 2 may repeat a process of starting the timer after the reception of the message, incrementing the value of the counter when the timer terminates, performing processing according to the message, and after performing the processing, restarting the timer, until the value of the counter exceeds the threshold.

The first to third exemplary embodiments may be combined as appropriate.

The method conducted in the wireless base station and the mobile station (UE) according to the present invention may be applied to a program to be executed by a computer. The program may even be stored on a storage medium or provided to the outside via a network.

Part or all of the above-described exemplary embodiments may be described as in the following supplementary notes, but they are not limited thereto.

(Supplementary Note 1)

A wireless base station comprising:

a communication unit which communicates with a mobile station which measures radio quality of a signal transmitted in each of a plurality of cells;

an acquisition unit which acquires load information related to a load of a network including a wireless base station forming the cell; and a control unit which receives information indicating a measurement result of the radio quality of the signal transmitted in each of the plurality of cells and a state of a battery of the mobile station, from the mobile station via the communication unit, determines a signal, radio quality of which is to be measured by the mobile station, on the basis of the measurement results of the radio qualities and the state of the battery of the mobile station, indicated in the received information, and the load information acquired by the acquisition unit, and notifies the signal determined to be measured to the mobile station via the communication unit.

(Supplementary Note 2)

The wireless base station according to supplementary note 1, wherein the signal transmitted in each of the plurality of cells includes signals having different communication schemes, and the control unit determines a signal, radio quality of which is to be measured by the mobile station, and transmits a message indicating at least one of a communication scheme of the signal to be measured and a frequency band of the signal to be measured to the mobile station via the communication unit.

(Supplementary Note 3)

The wireless base station according to supplementary note 1, wherein the signal transmitted in each of the plurality of cells includes signals having a predetermined frequency band including at least one component carrier serving as a unit frequency band, and the control unit determines the component carrier, radio quality of which is to be measured by the mobile station, and transmits a message indicating the component carrier to be measured to the mobile station via the communication unit.

(Supplementary Note 4)

The wireless base station according to supplementary note 1, wherein the signal transmitted in each of the plurality of cells includes a signal from each of the plurality of cells connected to the mobile station, and the control unit determines a signal, radio quality of which is to be measured by the mobile station, and transmits a message indicating at least one of a frequency band of the signal to be measured and a feature that connection to a cell in which a signal that is not to be measured is transmitted is to be released, to the mobile station via the communication unit.

(Supplementary Note 5)

A mobile station comprising:

a battery;

a communication unit which communicates with a wireless base station;

a measuring unit which measures radio quality of a signal transmitted in each of a plurality of cells; and a control unit which transmits information indicating a measurement result of the radio quality of the signal transmitted in each of the plurality of cells, obtained by the measuring unit, and a state of the battery of the mobile station, to the wireless base station via the communication unit, and, upon being notified a signal, the radio quality of which is to be measured, from the wireless base station via the communication unit, causes the measuring unit to measure the radio quality of the notified signal.

(Supplementary Note 6)

The mobile station according to supplementary note 5, wherein the signal transmitted in each of the plurality of cells includes signals having different communication schemes, and upon receiving a message indicating at least one of a communication scheme of a signal to be measured and a frequency band of the signal to be measured from the wireless base station via the communication unit, the control unit causes the measuring unit to measure radio quality of a signal having the communication scheme or the frequency band indicated in the message.

(Supplementary Note 7)

The mobile station according to supplementary note 5, wherein the signal transmitted in each of the plurality of cells includes signals having a predetermined frequency band including at least one component carrier serving as a unit frequency band, and upon receiving a message indicating a component carrier to be measured from the wireless base station via the communication unit, the control unit causes the measuring unit to measure radio quality of the component carrier indicated in the message.

(Supplementary Note 8)

The mobile station according to supplementary note 5, wherein the signal transmitted in each of the plurality of cells includes a signal from each of the plurality of cells connected to the mobile station, and upon receiving a message indicating at least one of a frequency band of the signal to be measured and a feature that connection to a cell in which a signal that is not to be measured is transmitted is to be cut off from the wireless base station via the communication unit, the control unit causes the measuring unit to measure radio quality of the signal indicated in the message and causes the communication unit to release the connection to the cell in which the signal that is not to be measured is transmitted.

(Supplementary Note 9)

A wireless communication system comprising: a mobile station; and a wireless base station which communicates with the mobile station, wherein the mobile station measures radio quality of a signal transmitted in each of a plurality of cells and transmits information indicating a measurement result of the radio quality of the signal transmitted in each of the plurality of cells and a state of a battery of the mobile station to the wireless base station, the wireless base station acquires load information related to a load of a network including a wireless base station forming the cell, determines a signal, radio quality of which is to be measured by the mobile station, on the basis of the measurement results of the radio qualities and the state of the battery of the mobile station, transmitted from the mobile station, and the acquired load information, and notifies the signal determined to be measured to the mobile station, and the mobile station measures radio quality of the signal notified from the wireless base station.

(Supplementary Note 10)

The wireless communication system according to supplementary note 9, wherein the signal transmitted in each of the plurality of cells includes signals having different communication schemes, the wireless base station determines a signal, radio quality of which is to be measured by the mobile station, and transmits a message indicating at least one of a communication scheme of the signal to be measured and a frequency band of the signal to be measured to the mobile station, and upon receiving the message indicating the at least one of the communication scheme of the signal to be measured and the frequency band of the signal to be measured from the wireless base station, the mobile station measures radio quality of the signal having the communication scheme or the frequency band indicated in the message.

(Supplementary Note 11)

The wireless communication system according to supplementary note 9, wherein the signal transmitted in each of the plurality of cells includes signals having a predetermined frequency band including at least one component carrier serving as a unit frequency band, the wireless base station determines a component carrier, radio quality of which is to be measured by the mobile station, and transmits a message indicating the component carrier to be measured to the mobile station, and upon receiving the message indicating the component carrier to be measured from the wireless base station, the mobile station measures radio quality of the component carrier indicated in the message.

(Supplementary Note 12)

The wireless communication system according to supplementary note 9, wherein the signal transmitted in each of the plurality of cells includes a signal from each of the plurality of cells connected to the mobile station, the wireless base station determines a signal, radio quality of which is to be measured by the mobile station, and transmits a message indicating at least one of a frequency band of the signal to be measured and a feature that connection to a cell in which a signal that is not to be measured is transmitted is to be released, and upon receiving the message indicating the at least one of the frequency band of the signal to be measured and a feature that the connection to the cell in which the signal that is not to be measured is transmitted is to be cut off from the wireless base station, the mobile station measures radio quality of the signal indicated in the message and releases the connection to the cell in which the signal that is not to be measured is transmitted.

(Supplementary Note 13)

A control method for a wireless base station, the method comprising:

communicating with a mobile station which measures radio quality of a signal transmitted in each of a plurality of cells;

acquiring load information related to a load of a network including a wireless base station forming the cell; and receiving information indicating a measurement result of the radio quality of the signal transmitted in each of the plurality of cells and a state of a battery of the mobile station, from the mobile station, determining a signal, radio quality of which is to be measured by the mobile station, on the basis of the measurement results of the radio qualities and the state of the battery of the mobile station, indicated in the received information, and the load information acquired by the acquisition unit, and notifying the signal determined to be measured to the mobile station.

(Supplementary Note 14)

A program for causing a computer within a wireless base station to perform the processes of:

communicating with a mobile station which measures radio quality of a signal transmitted in each of a plurality of cells;

acquiring load information related to a load of a network including a wireless base station forming the cell; and receiving information indicating a measurement result of the radio quality of the signal transmitted in each of the plurality of cells and a state of a battery of the mobile station, from the mobile station, determining a signal, radio quality of which is to be measured by the mobile station, on the basis of the measurement results of the radio qualities and the state of the battery of the mobile station, indicated in the received information, and the load information acquired by the acquisition unit, and notifying the signal determined to be measured to the mobile station.

Although the present invention has been described above with reference to exemplary embodiments, the present invention is not limited to the above-described exemplary embodiments. Various changes which would be understood by those skilled in the art may be made to the configurations or details of the present invention within the scope of the present invention. This application claims priority based on Japanese Patent Application No. 2014-199733 filed on Sep. 30, 2014, the disclosure of which is incorporated herein in its entirety.

REFERENCE SIGNS LIST

1 Wireless communication system
2 UE
3 E-UTRAN
4 UTRAN
5 GSM
6 WLAN
11 HeNB
12 HeNB-GW
13, 14 (H)eNB
15 X2-GW
16 EPC
17, 29 PGW
18 ANDSF
19 NodeB
20 HNB
21 HNB-GW
22 RNC
23 3GCN
24 BTS
25 BSC
26 GCN
27 WLAN AP
28 ePDG
30 eNB 31 MeNB
32 SeNB
101, 301, 401 Communication unit
102, 302, 402 Storage unit
103, 303, 403 Control unit
201 Communication unit
202 Measuring unit
203 Storage unit
204 Battery
205 Control unit

What is claimed is:

1. A wireless base station comprising:
a communication unit configured to communicate with a mobile station which measures radio quality of a signal transmitted in each of a plurality of cells;
an acquisition unit configured to acquire load information related to a load of a network including a wireless base station forming the each cell; and
a control unit configured to receive information indicating a measurement result of the radio quality of the signal transmitted in each of the plurality of cells and a state of a battery of the mobile station, from the mobile station via the communication unit,
determine a signal, radio quality of which is to be measured by the mobile station, based on the measurement results of the radio qualities and the state of the battery of the mobile station, indicated in the information received, and the load information acquired by the acquisition unit,
transmits, to the mobile station via the communication unit, a message indicating a frequency band of the signal to be measured and information that connection to a cell in which a signal that is not to be measured is transmitted is to be released, or a message indicating information that connection to a cell in which a signal that is not to be measured is transmitted is to be released, and
notify the signal determined to be measured to the mobile station via the communication unit,
wherein the signal transmitted in each of the plurality of cells includes a signal from each of the plurality of cells connected to the mobile station.

2. A mobile station comprising:
a battery;
a communication unit configured to communicate with a wireless base station;
a measuring unit configured to measure radio quality of a signal transmitted in each of a plurality of cells; and
a control unit configured to transmit, to the wireless base station via the communication unit, information indicating a measurement result of the radio quality of the signal transmitted in each of the plurality of cells, obtained by the measuring unit, and a state of the battery of the mobile station, and,
upon being notified a signal, the radio quality of which is to be measured, from the wireless base station via the communication unit, causes the measuring unit to measure the radio quality of the notified signal,
wherein the signal transmitted in each of the plurality of cells includes a signal from each of the plurality of cells connected to the mobile station, and
wherein upon receiving, via the communication unit, a message indicating a frequency band of the signal to be measured and information that connection to a cell in which a signal that is not to be measured is transmitted is to be released, or a message indicating information that connection to a cell in which a signal that is not to be measured is transmitted is to be released, the control unit causes the measuring unit to measure the frequency band of the signal to be measured or releases the connection to the cell in which the signal that is not to be measured.

3. A control method for a wireless base station, the method comprising:
communicating with a mobile station which measures radio quality of a signal transmitted in each of a plurality of cells;
acquiring load information related to a load of a network including a wireless base station forming the each cell;
receiving information indicating a measurement result of the radio quality of the signal transmitted in each of the plurality of cells and a state of a battery of the mobile station, from the mobile station;
determining a signal, radio quality of which is to be measured by the mobile station, based on the measurement results of the radio qualities and the state of the battery of the mobile station, indicated in the received information, and the load information acquired by the acquisition unit;
transmitting, to the mobile station via the communication unit, a message indicating a frequency band of the signal to be measured and information that connection to a cell in which a signal that is not to be measured is transmitted is to be released, or a message indicating information that connection to a cell in which a signal that is not to be measured is transmitted is to be released, and
notifying the signal determined to be measured to the mobile station,
wherein the signal transmitted in each of the plurality of cells includes a signal from each of the plurality of cells connected to the mobile station.

* * * * *